(12) United States Patent
Anderson et al.

(10) Patent No.: US 12,096,769 B2
(45) Date of Patent: Sep. 24, 2024

(54) MECHANISM OF UREA/SOLID ACID INTERACTION UNDER STORAGE CONDITIONS AND STORAGE STABLE SOLID COMPOSITIONS COMPRISING UREA AND ACID

(71) Applicant: ECOLAB USA INC., Saint Paul, MN (US)

(72) Inventors: Derrick Anderson, Saint Paul, MN (US); Victor Fuk-Pong Man, Saint Paul, MN (US); Paul Christian, Saint Paul, MN (US); Meghan Babcock, Saint Paul, MN (US); Altony J. Miralles, Saint Paul, MN (US)

(73) Assignee: ECOLAB USA INC., Saint Paul, MN (US)

(*) Notice: Subject to any disclaimer, the term of this patent is extended or adjusted under 35 U.S.C. 154(b) by 159 days.

(21) Appl. No.: 17/453,891

(22) Filed: Nov. 8, 2021

(65) Prior Publication Data
US 2022/0053757 A1  Feb. 24, 2022

Related U.S. Application Data

(63) Continuation of application No. 15/909,401, filed on Mar. 1, 2018, now Pat. No. 11,191,264.

(60) Provisional application No. 62/465,434, filed on Mar. 1, 2017.

(51) Int. Cl.
| | | |
|---|---|---|
| A01N 25/22 | (2006.01) | |
| A01N 25/30 | (2006.01) | |
| A01N 33/12 | (2006.01) | |
| A01N 47/28 | (2006.01) | |
| C11D 1/04 | (2006.01) | |
| C11D 1/12 | (2006.01) | |
| C11D 1/34 | (2006.01) | |
| C11D 3/04 | (2006.01) | |
| C11D 3/20 | (2006.01) | |
| C11D 3/32 | (2006.01) | |
| C11D 3/34 | (2006.01) | |
| C11D 3/36 | (2006.01) | |
| C11D 3/37 | (2006.01) | |
| C11D 7/08 | (2006.01) | |
| C11D 7/26 | (2006.01) | |
| C11D 7/32 | (2006.01) | |
| C11D 9/30 | (2006.01) | |
| C11D 11/00 | (2006.01) | |
| C11D 11/04 | (2006.01) | |

(52) U.S. Cl.
CPC ............ *A01N 25/22* (2013.01); *A01N 25/30* (2013.01); *A01N 33/12* (2013.01); *A01N 47/28* (2013.01); *C11D 1/04* (2013.01); *C11D 1/12* (2013.01); *C11D 1/34* (2013.01); *C11D 3/042* (2013.01); *C11D 3/2075* (2013.01); *C11D 3/323* (2013.01); *C11D 3/3409* (2013.01); *C11D 3/3418* (2013.01); *C11D 3/3472* (2013.01); *C11D 3/361* (2013.01); *C11D 3/362* (2013.01); *C11D 3/365* (2013.01); *C11D 3/37* (2013.01); *C11D 7/08* (2013.01); *C11D 7/265* (2013.01); *C11D 7/3272* (2013.01); *C11D 9/30* (2013.01); *C11D 11/0082* (2013.01); *C11D 11/04* (2013.01)

(58) Field of Classification Search
CPC .............. C11D 1/38; C11D 1/66; C11D 3/323
See application file for complete search history.

(56) References Cited

U.S. PATENT DOCUMENTS

| | | | | |
|---|---|---|---|---|
| 2,860,106 | A | * | 11/1958 | Little ................. C11D 3/0047 510/501 |
| 4,944,787 | A | | 7/1990 | Young |
| 5,244,468 | A | | 9/1993 | Harris et al. |
| 6,432,906 | B1 | * | 8/2002 | Carlson .............. C11D 17/0052 510/501 |
| 7,033,511 | B2 | | 4/2006 | Zawada et al. |
| 7,446,084 | B2 | | 11/2008 | Barthel et al. |
| 8,252,122 | B2 | | 8/2012 | Haake et al. |
| 11,191,264 | B2 | * | 12/2021 | Anderson ................ C11D 3/37 |
| 2002/0173437 | A1 | | 11/2002 | Rabon et al. |
| 2007/0244024 | A1 | | 10/2007 | Barthel et al. |
| 2010/0311634 | A1 | | 12/2010 | Besse et al. |
| 2011/0152156 | A1 | | 6/2011 | Sauter et al. |

(Continued)

FOREIGN PATENT DOCUMENTS

| | | | | |
|---|---|---|---|---|
| EP | 0740698 | A1 | 11/1996 | |
| EP | 0740698 | B1 * | 4/1999 | ............... C11D 3/32 |

(Continued)

OTHER PUBLICATIONS

"The International Search Report and Written Opinion of the International Searching Authority", in connection to PCT/US2018/020408, filed Mar. 1, 2018, mailed May 25, 2018.

(Continued)

*Primary Examiner* — Clinton A Brooks
*Assistant Examiner* — George W Kosturko
(74) *Attorney, Agent, or Firm* — McKee, Voorhees & Sease, PLC

(57) ABSTRACT

Solid rinsing, cleaning and/or sanitizing compositions for various applications are provided. In particular, solid compositions include a complex of urea and an acid having desirable storage stability previously unavailable in solid urea/acid compositions. Stable solid compositions are disclosed and methods of making the same to overcome conventional limitations associated with forming kinetically and thermodynamically stable solids that utilize urea/acid compositions.

14 Claims, 10 Drawing Sheets

(56) References Cited

U.S. PATENT DOCUMENTS

| | | |
|---|---|---|
| 2012/0108484 A1 | 5/2012 | Becker et al. |
| 2012/0291815 A1 | 11/2012 | Monsrud et al. |
| 2013/0055508 A1 | 3/2013 | Miralles et al. |
| 2013/0102518 A1 | 4/2013 | Miralles et al. |
| 2013/0111675 A1 | 5/2013 | Soontravanich et al. |
| 2015/0299627 A1 | 10/2015 | Soontravanich et al. |

FOREIGN PATENT DOCUMENTS

| | | | |
|---|---|---|---|
| JP | 6507905 | A | 9/1994 |
| JP | 967599 | A | 3/1997 |
| JP | 1997507260 | A | 7/1997 |
| JP | 101870 | A | 1/1998 |
| JP | 2002515551 | A | 5/2002 |
| JP | 2007527947 | A | 10/2007 |
| JP | 2009543677 | A | 12/2009 |
| WO | 2009059630 | A1 | 5/2009 |

OTHER PUBLICATIONS

Yoshikubo et al., "Sulfamic Acid and Sulfamates", Kirk-Othmer Encyclopedia of Chemical Technology, pp. 1-13, 2021.

Paleckiene et al., "Reaction of Urea with Citric Acid", Russian Journal of Applied Chemistry, vol. 78, No. 10, pp. 1651-1655, May 12, 2005.

Russell, S.M., "Chemical Sanitizing Agents and Spoilage Bacteria on Fresh Broiler Carcasses", Journal Applied Poultry Research, vol. 7, pp. 273-280 (1998) 1998.

Dalman, Lawrence H., "Ternary Systems of Urea and Acids", Journal of the American Chemical Society, vol. 59, No. 5, pp. 775-779 (1937). 1937.

\* cited by examiner

MECHANISM OF UREA/SOLID ACID INTERACTION UNDER STORAGE CONDITIONS AND STORAGE STABLE SOLID COMPOSITIONS COMPRISING UREA AND ACID

CROSS-REFERENCE TO RELATED APPLICATIONS

This application is a continuation of U.S. Ser. No. 15/909,401, filed Mar. 1, 2018, which claims priority under 35 U.S.C. § 119 to provisional application Ser. No. 62/465,434, filed Mar. 1, 2017, all of which are herein incorporated by reference in their entirety.

FIELD OF THE INVENTION

The invention relates to solidification of stable solid compositions particularly useful for solid cleaning, rinsing and/or sanitizing compositions. In particular, the invention relates to solidification of urea and acid compositions suitable to overcome conventional limitations associated with the formation of a stable solid utilizing urea/acid compositions.

BACKGROUND OF THE INVENTION

Many solid formulas are limited by the solid actives either commercially available and/or in stable solid form. Various attempts have been made in the past to include liquid acids and/or solid acids into solid compositions; however, these have been largely unsuccessful for a variety of reasons including stability of the solid compositions and/or the methods required for solification. Further there have been attempts to include both acids with a urea in a solid compositions, along with additional active components (e.g. quaternary ammonium compounds) which have been unable to maintain the composition stability and/or the efficacy of the active component incorporated therein. This has resulted in less desirable performance of the solid cleaning compositions where an acid is to be employed.

Yet another challenge in the solid formulations employing a urea solidification agent and an acid is the amount of water content remaining in the solidified composition when a liquid acid is employed. For certain manufacturing processes and formulations, it is desirable to have a low water content in a solid composition, for dimensional stability of the resultant solid composition, and in some instances to permit the use of pressing methods for the manufacturing of the solid composition.

The various solid formulations and processes must combine ingredients and successfully produce a stable solid product that can be packaged, stored, distributed and used in a variety of use locations. This has been a shortcoming of various solid compositions, which can swell, crack or crumble after solidification (i.e., where dimensionally unstable as a result of kinetic and/or thermodynamic instability). This can interfere with packaging, dispensing, and use. The dimensional instability of the solid materials can relate to the unstable nature of various hydrate compositions.

Accordingly, it is an objective of the claimed invention to develop solid compositions, methods of making, and methods of using the same for various applications by employing urea and an acid to form a solid complex as a solidification matrix for a solid composition.

It is an objective of the claimed invention to provide solid detergent compositions that exhibit exceptional dimensional stability, including kinetic and/or thermodynamic stability.

It is an objective of the claimed invention for the solid compositions to be further formulated for cleaning, sanitizing, rinsing, warewashing, floorcare, and other applications by formulating the solid urea/acid complex with additional active components. It is an embodiment of the invention to provide stable solid compositions comprising the solid urea/acid complex with quaternary ammonium compounds. It is an embodiment of the invention to provide stable solid compositions comprising the solid urea/acid complex with quaternary ammonium compounds and anionic surfactants. It is an embodiment of the invention to provide stable solid compositions comprising the solid urea/acid complex with nonionic surfactants.

It is a further embodiment of the invention to provide stable solid compositions employing a pressed solid method of making.

Other objects, advantages and features of the present invention will become apparent from the following specification taken in conjunction with the accompanying drawings.

BRIEF SUMMARY OF THE INVENTION

An advantage of the invention is the stable solidification matrix provided by the complexed urea and an acid. The stabilized compositions provide compositions that can be formulated with additional actives suitable for various cleaning, rinsing and/or sanitizing compositions and applications of use.

In some embodiments of the present invention, compositions, methods of making and methods of using the same provide a solid cleaning, sanitizing and/or rinsing composition containing a stable solid urea and acid complex.

In additional embodiments, the solid compositions containing a stable solid urea and acid complex can further include a quaternary ammonium compound. In still further embodiments, the solid compositions containing a stable solid urea and acid complex can further include a quaternary ammonium compound and an anionic surfactant.

In additional embodiments, the solid compositions containing a stable solid urea and acid complex can further include a nonionic surfactant.

Methods of making the various compositions are also included in the embodiments of the invention.

Methods of employing the various compositions are also included in the embodiments of the invention.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
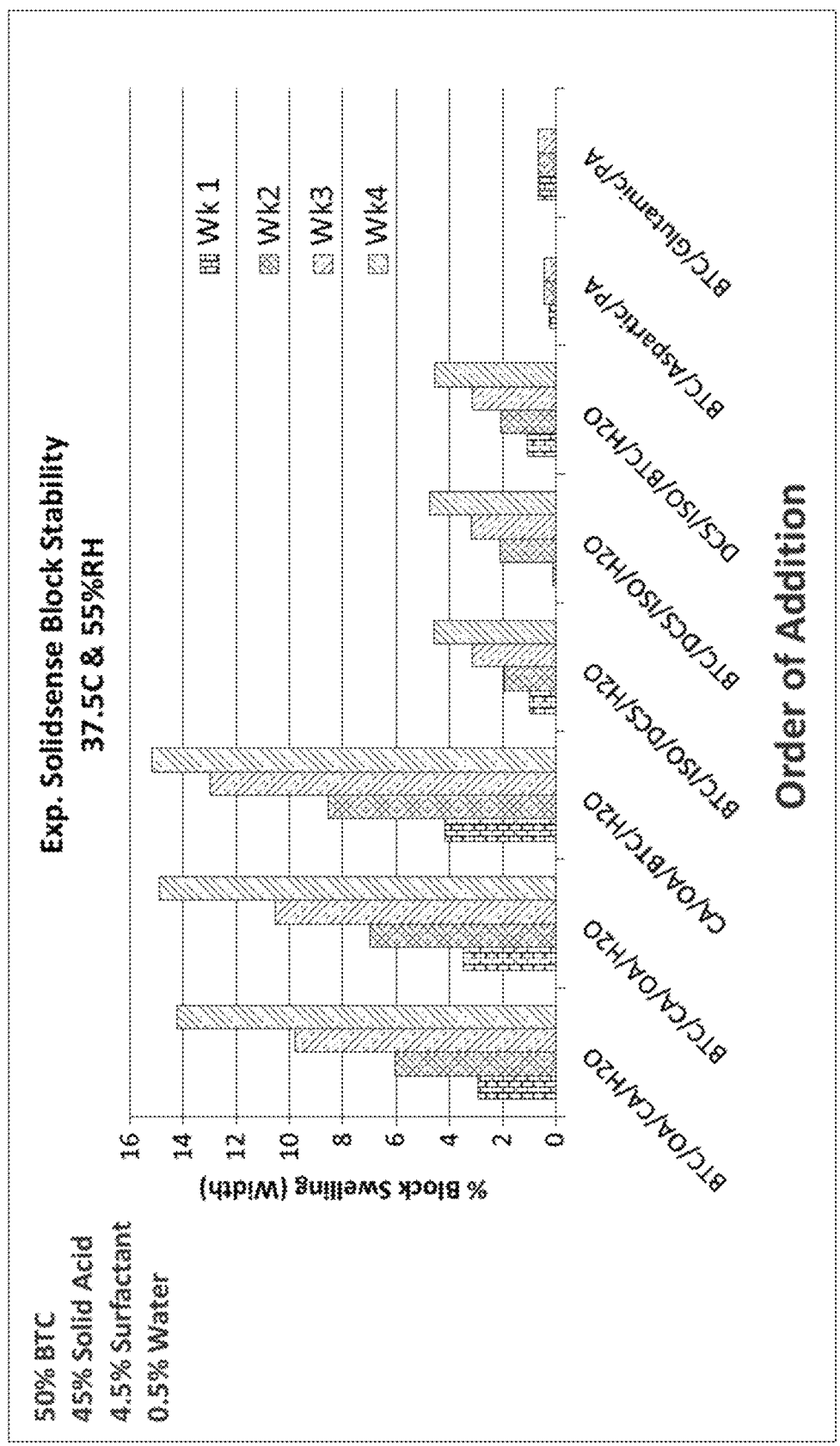
FIG. 1 shows the block stability over 4 weeks of the formulations using various exemplary acid(s) as the acid filler with 50 wt-% of BTC, 45 wt-% of the acid filler, 4.5 wt-% surfactant, and 0.5 wt % water.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE INVENTION

The embodiments of this invention are not limited to a particular method and/or product, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

For the purpose of this patent application, successful microbial reduction is achieved when the microbial populations are reduced by at least about 50%, or by significantly more than is achieved by a wash with water. Larger reductions in microbial population provide greater levels of protection.

The term "laundry" refers to items or articles that are cleaned in a laundry washing machine. In general, laundry refers to any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated. Exemplary treated fibers include those treated for flame retardancy. It should be understood that the term "linen" is often used to describe certain types of laundry items including bed sheets, pillow cases, towels, table linen, table cloth, bar mops and uniforms. The invention additionally provides a composition and method for treating non-laundry articles and surfaces including hard surfaces such as dishes, glasses, and other ware.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt %. More preferably, the amount of phosphorus is less than 0.1 wt-%, and most preferably the amount of phosphorus is less than 0.01 wt %.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "sanitizer" refers to an agent that reduces the number of bacterial contaminants to safe levels as judged by public health requirements. In an embodiment, sanitizers for use in this invention will provide at least a 99.999% reduction (5-log order reduction). These reductions can be evaluated using a procedure set out in *Germicidal and Detergent Sanitizing Action of Disinfectants*, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25±2° C., against several test organisms. According to embodiments of the invention, a sanitizing rinse provides a 99.999% reduction (5-log order reduction) of the desired organisms (including bacterial contaminants) at a use temperature. Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbistatic. A sanitizer and a disinfectant are, by definition, agents which provide antimicrobial or microbiocidal activity. In contrast, a preservative is generally described as an inhibitor or microbistatic composition As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "substantially similar" or a variation thereof refers generally to a substitute ingredient (e.g., liquid acid substituted with solidified acid) to providing generally the same degree (or at least not a significantly lesser degree) of the referenced activity or effect.

The term "surfactant" as used herein is a compound that contains a lipophilic segment and a hydrophilic segment, which when added to water or solvents, reduces the surface tension of the system.

The term "threshold agent" refers to a compound that inhibits crystallization of water hardness ions from solution, but that need not form a specific complex with the water hardness ion. Threshold agents include but are not limited to a polyacrylate, a polymethacrylate, an olefin/maleic copolymer, and the like.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polycarbonate polymers (PC), acrilonitrile-butadiene-styrene polymers (ABS), and polysulfone polymers (PS). Another exemplary plastic that can be cleaned using the compounds and compositions of the invention include polyethylene terephthalate (PET).

The term "water soluble" refers to a compound that can be dissolved in water at a concentration of more than 1 wt. %. The term "sparingly water soluble" refer to a compound that can be dissolved in water only to a concentration of 0.1 to 1.0 wt. %. The term "water insoluble" refers to a compound that can be dissolved in water only to a concentration of less than 0.1 wt. %.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Stable Solid Compositions

According to the invention, stable solid compositions combining at least urea and an acid to form a solid complex are provided. The stable solid compositions can further include additional actives without comprising solid stability and or composition stability for the performance of the actives upon dissolution for a use solution. It has been discovered that combinations of molar ratios of urea and acid provide a solid product under conventional storage conditions, overcoming the stability issues conventionally associated with acid fillers for solid compositions.

In an aspect of the invention, the solid compositions exhibit exceptional dimensional stability, including kinetic and/or thermodynamic stability. In an aspect, the solid compositions are dimensionally stable and have a growth exponent of less than about 3% if heated at a temperature up to approximately 100° F., up to approximately 120° F., or up to approximately 120° F. for an extended period of time, such as at least 30 minutes, or at least one hour, or even up to two weeks, up to four weeks, up to six weeks, or up to eight weeks, and at a humidity between about 40-65%.

Beneficially, the solid compositions exhibit the storage stability with or without packaging of the solid compositions. The compositions may be packaged in a variety of materials including a water soluble film, disposable plastic container, flexible bag, shrink wrap, multi-vac, and the like. In some embodiments, a solid composition formed according to the methods of the present invention is packaged directly upon formation. That is, a solid composition is formed in the packaging from which it will be stored or dispensed. In some embodiments, the solid will be formed directly into a thin film plastic or a shrink wrapper. The solid may be formed in an packaging suitable for storage and/or dispensing of the solid.

Manufacturing Methods of Solid Compositions

The solidified compositions of the invention comprising urea and an acid can be included in various cleaning, sanitizing, rinsing and other solid compositions. By the term "solid", it is meant that the hardened composition will not flow and will substantially retain its shape under moderate stress or pressure or mere gravity. Suitable solid compositions, include, but are not limited to granular and pelletized solid compositions, flakes, powders, granule, pellet, tablet, lozenge, puck, briquette, brick, unit dose, solid block composition, cast solid block compositions, extruded solid block composition, pressed solid compositions, or another solid form known to those of skill in the art.

The resulting solid cleaning composition may take forms as well as sizes. In an exemplary embodiment, pellet materials formed by the solid composition comprising at least the urea and acid complex have a weight of between approximately 50 grams and approximately 250 grams, extruded solids formed by the composition have a weight of approximately 100 grams or greater, and solid block detergents formed by the composition have a mass of between approximately 1 and approximately 10 kilograms. The solid compositions provide for a stabilized source of functional materials for providing the actives for the various cleaning, sanitizing and/or rinsing applications described herein.

The degree of hardness of the solid cast composition and/or a pressed solid composition may range from that of a fused solid product which is relatively dense and hard, for example, like concrete, to a consistency characterized as being a hardened paste. In addition, the term "solid" refers to the state of the cleaning composition under the expected conditions of storage and use of the solid cleaning composition. In general, it is expected that the cleaning composition will remain in solid form when exposed to temperatures of up to approximately 100° F., up to approximately 120° F., or up to approximately 120° F. while maintaining physical and dimensional stability. The dimensional stability of the solid composition is confirmed by a growth exponent of less than about 3% if heated at a temperature up to approximately 100° F., up to approximately 120° F., or up to approximately 120° F. for an extended period of time, such as at least 30 minutes, or at least one hour, up to two weeks, up to four weeks, up to six weeks, or up to eight weeks, and at a humidity between about 40-65%.

In general, the various solid compositions are made by preforming (or first forming) a solid complex of the urea and acid. In some aspects, the urea and acid can be combined by blending or mixing the dry solid ingredients according to the invention in appropriate ratios or agglomerating the materials in appropriate agglomeration systems. As referred to herein, blending or mixing can include any mechanisms known to those skilled in the art, including for example, a ribbon blender. In an alternative aspect, the solid complex can be formed by first providing an aqueous solution of the urea and acid. Various methods of forming the solid complex can be employed as one skilled in the art will ascertain to form a solid complex and is not intended to limit the scope of the invention, including the solid compositions, methods of making and/or methods of employing the same.

The formation of the urea/acid solid complex beneficially and unexpectedly overcomes the stability limitations of most acid fillers for a solid composition, as shown in the Examples. Without being limited to a particular mechanism of action or theory, the preforming of the acid/urea solid complex overcomes the unfavorable intermolecular interactions than can occur as a result of other actives interacting with the acid. In an embodiment, as demonstrated according to the Examples, the acid can react with an active, such as a quaternary ammonium compound when complexed and further combined with urea. This can be observed by dimensional instability of the solid composition as a result of the active (e.g. quaternary ammonium compound) being released from the urea and forming urea/acid complexes instead causing undesirable dimensional changes in the solid due to density changes. Moreover, the urea/acid complex maintains an optimal pH for the compositions and various applications of use for cleaning, rinsing and/or sanitizing, and also allows for use of broader types of acids independent of the water solubility of the acid. As shown in the Examples, without the solid complex of the urea/acid, only low solubility or sparingly soluble acids will work for formulating compositions having any stability; whereas when the urea/acid solid complex is employed, most acids, including high solubility, low solubility, sparingly soluble and/or insoluble acids can be employed for the compositions according to the invention.

In another aspect, the reactivity of the urea and acid under stressed storage conditions are shown to be impacted by both solubility of the acid as reacted with urea (a weak base) and pKa of the strongest proton of the acid.

Solid Compositions

Suitable solid compositions produced by the methods of the application may take a variety of forms including, but not limited to, granular and pelletized solid compositions, flakes, powders, granule, pellet, tablet, lozenge, puck, briquette, brick, unit dose, solid block composition, cast solid block compositions, extruded solid block composition, pressed solid compositions, or another solid form known to those of skill in the art. In a pressed solid process, a flowable solid, such as granular solids or other particle solids are combined under pressure to form the solid composition. In a pressed solid process, flowable solids of the compositions are placed into a form (e.g. a mold or container). The method can include gently pressing the flowable solid in the form to produce the solid cleaning composition. Pressure may be applied by a block machine or a turntable press, or the like. Pressure may be applied at about 1 to about 3000 psi, about 1 to about 2000 psi, about 1 to about 1000 psi, about 1 to about 500 psi, about 1 to about 300 psi, about 5 psi to about 200 psi, or about 10 psi to about 100 psi. In certain embodiments, the methods can employ pressures as low as greater than or equal to about 1 psi, greater than or equal to about 2, greater than or equal to about 5 psi, or greater than or equal to about 10 psi. As used herein, the term "psi" or "pounds per square inch" refers to the actual pressure applied to the flowable solid being pressed and does not refer to the gauge or hydraulic pressure measured at a point in the apparatus doing the pressing.

The methods can optionally include a curing step to produce the solid compositions. As referred to herein, an uncured composition including the flowable solid is compressed to provide sufficient surface contact between particles making up the flowable solid that the uncured composition will solidify into a stable solid composition. A sufficient quantity of particles (e.g. granules) in contact with one another provides a binding of particles effective for making a stable solid composition. Inclusion of a curing step may included, allowing the pressed solid to solidify for a period of time, such as a few hours, or about 1 day (or longer). In additional aspects, the methods could include vibrating the flowable solid in the form or mold, such as the methods disclosed in U.S. Pat. No. 8,889,048, which is herein incorporated by reference in its entirety.

The use of pressed solids provides numerous benefits over conventional solid block or tablet compositions, which can require high pressure in a tablet press, or casting requiring the melting of a composition consuming significant amounts of energy, and/or extrusion requiring expensive equipment and advanced technical expertise. Moreover, pressed solid compositions retain their shape under conditions where the compositions may be stored or handled.

In an aspect, pelletized materials can be formed by compressing the solid granular or agglomerated complex of urea and acid in appropriate pelletizing equipment to result in appropriately sized pelletized materials. Solid block and cast solid block materials can be made by introducing into a container either a prehardened block of the complex of urea and acid or a castable liquid formulation of the complex of urea and acid that hardens into a solid block within a container. Preferred containers include disposable plastic containers or water soluble film containers. Other suitable packaging for the composition includes flexible bags, packets, shrink wrap, and water soluble film such as polyvinyl alcohol.

In other aspects, the solid compositions may be formed using a batch or continuous mixing system to combine the complex of urea and acid. In an exemplary embodiment, a single- or twin-screw extruder is used to combine and mix one or more components at high shear to form a homogeneous mixture. In some embodiments, the processing temperature is at or below the melting temperature of the components. The processed mixture may be dispensed from the mixer by forming, casting or other suitable means, whereupon the cleaning composition hardens to a solid form. The structure of the matrix may be characterized according to its hardness, melting point, material distribution, crystal structure, and other like properties according to known methods in the art. Generally, a solid composition processed according to these methods is substantially homogeneous with regard to the distribution of ingredients (e.g. complex of urea and acid) throughout its mass and is dimensionally stable.

In an extrusion process, the liquid and solid components (e.g. urea and acid added as liquid and solid components) are introduced into final mixing system and are continuously mixed until the components form a substantially homogeneous semi-solid mixture in which the components are distributed throughout its mass. The mixture is then discharged from the mixing system into, or through, a die or other shaping means. The product is then packaged. In an exemplary embodiment, the formed composition begins to harden to a solid form in between approximately 1 minute and approximately 3 hours. Particularly, the formed composition begins to harden to a solid form in between approximately 1 minute and approximately 2 hours. More particularly, the formed composition begins to harden to a solid form in between approximately 1 minute and approximately 20 minutes.

In a casting process, the liquid and solid components (e.g. urea and acid added as liquid and solid components) are introduced into the final mixing system and are continuously mixed until the components form a substantially homogeneous liquid mixture in which the components are distributed throughout its mass. In an exemplary embodiment, the components are mixed in the mixing system for at least approximately 60 seconds. Once the mixing is complete, the product is transferred to a packaging container where solidification takes place. In an exemplary embodiment, the cast composition begins to harden to a solid form in between approximately 1 minute and approximately 3 hours. Particularly, the cast composition begins to harden to a solid form in between approximately 1 minute and approximately 2 hours. More particularly, the cast composition begins to harden to a solid form in between approximately 1 minute and approximately 20 minutes.

Exemplary Embodiments of the Stable Solid Compositions

Exemplary ranges of the stable compositions in a concentrated solid composition according to the invention are shown in Tables 1A-1D each in weight percentage. Table 1A shows an exemplary solid composition comprising only the solidification components of the urea and acid having a preformed molar ratio to provide the solid composition.

TABLE 1A

| Material | First Exemplary Range wt-% | Second Exemplary Range wt-% | Third Exemplary Range wt-% |
|---|---|---|---|
| Urea/Acid complex | 5-95 | 10-90 | 20-80 |
| Additional Functional Ingredients | 0-75 | 0-60 | 0-50 |

Table 1B shows an exemplary solid composition comprising a urea/quaternary ammonium compound complex with the acid. As set forth further in the description the quaternary ammonium compound can be further adducted to urea when provided in combination with the solid urea/acid complex.

TABLE 1B

| Material | First Exemplary Range wt-% | Second Exemplary Range wt-% | Third Exemplary Range wt-% |
|---|---|---|---|
| Urea/Acid complex | 5-95 | 10-90 | 20-70 |
| Quaternary ammonium compound (e.g. quat and urea adduct) | 0.001-75 | 1-50 | 1-30 |
| Additional Functional Ingredients | 0-75 | 0-60 | 0-50 |

Table 1C shows an exemplary solid composition comprising a urea/quaternary ammonium compound complex with the acid and additional active anionic surfactants for antimicrobial and/or sanitizing solid compositions. As set forth further in the description the quaternary ammonium compound can be further adducted to urea when provided in combination with the solid urea/acid complex.

TABLE 1C

| Material | First Exemplary Range wt-% | Second Exemplary Range wt-% | Third Exemplary Range wt-% |
|---|---|---|---|
| Urea/Acid complex | 5-95 | 10-90 | 20-70 |
| Quaternary ammonium compound (e.g. quat and urea adduct) | 1-75 | 5-75 | 20-60 |
| Anionic surfactants | 0.0001-50 | 0.1-30 | 0.1-20 |
| Additional Functional Ingredients | 0-75 | 0-60 | 0-50 |

Table 1D shows an exemplary solid composition comprising an additional active nonionic surfactant with the urea and acid for solid rinse aid compositions.

TABLE 1D

| Material | First Exemplary Range wt-% | Second Exemplary Range wt-% | Third Exemplary Range wt-% |
|---|---|---|---|
| Urea/Acid complex | 5-95 | 10-90 | 20-70 |
| Nonionic surfactants | 0.0001-50 | 0.1-30 | 0.1-20 |
| Additional Functional Ingredients | 0-75 | 0-60 | 0-50 |

The solid compositions according to the invention provide a stable solid comprising the preformed solid complex in an amount from about 5 wt-% to about 99 wt-% of the solid composition, or from about 5 wt-% to about 95 wt-% of the solid composition, or from about 10 wt-% to about 90 wt-% of the solid composition, or from about 40 wt-% to about 80 wt-% of the solid composition, or from about 40 wt-% to about 70 wt-% of the solid composition, or from about 40 wt-% to about 90 wt-% of the solid composition, or from about 50 wt-% to about 70 wt-% of the solid composition.

The solid compositions according to the invention provide a stable solid comprising the complex of urea and an acid. In an aspect, the ratio of the urea to acid in the solid complex is molar ratio dependent. In an aspect, the solid complex of urea and acid include approximately a mole to mole ratio of the urea to acid. In other aspects, the solid complex of urea and acid include from about a 1 to about a 3 molar ratio of urea to acid, to about a 3 to about a 1 molar ratio of urea to acid. In another embodiment, the solid complex of urea and acid include from about a 1 to about a 2 molar ratio of urea to acid, to about a 2 to about a 1 molar ratio of urea to acid. In preferred embodiments, the solid complex of urea and acid include about a 1 to 1 molar ratio of urea to acid.

In other aspects, the ratio of the urea to acid in the solid composition is molar ratio dependent as well. In an aspect, the solid compositions include approximately a mole to mole ratio of the total urea to total acid. In other aspects, the solid compositions include from about a 1 to about a 10 molar ratio of urea to acid, to about a 10 to about a 1 molar ratio of urea to acid. In another embodiment, the solid compositions include from about a 1 to about a 9 molar ratio of urea to acid, to about a 9 to about a 1 molar ratio of urea to acid, from about a 1 to about a 8 molar ratio of urea to acid, to about a 8 to about a 1 molar ratio of urea to acid, from about a 1 to about a 7 molar ratio of urea to acid, to about a 7 to about a 1 molar ratio of urea to acid, from about a 1 to about a 6 molar ratio of urea to acid, to about a 6 to about a 1 molar ratio of urea to acid from about a 1 to about a 2 molar ratio of urea to acid, from about a 1 to about a 5 molar ratio of urea to acid, to about a 5 to about a 1 molar ratio of urea to acid, from about a 1 to about a 4 molar ratio of urea to acid, to about a 4 to about a 1 molar ratio of urea to acid, from about a 1 to about a 3 molar ratio of urea to acid, to about a 3 to about a 1 molar ratio of urea to acid, from about a 2 to about a 1 molar ratio of urea to acid from about a 1 to about a 2 molar ratio of urea to acid, to about a 2 to about a 1 molar ratio of urea to acid. In preferred embodiments, the solid compositions include about a 1 to 1 molar ratio of urea to acid.

According to the invention, the molar ratio of the urea and acid provides a solid complex for formulating with various active components as disclosed herein according to the various applications of use. The various solid compositions set forth in the various tables of Table 1 have any suitable pH for applications of use, including from about 1 to about 12. However, according to aspects of the invention, the diluted use solutions may have acidic or neutral to alkaline pH depending upon a particular application of use thereof, including from about 1 to about 7, from about 1 to about 6.5, or from about 2 to about 6. In other aspects, the compositions of the invention have a pH between about 2 and about 5.5, or between about 3 and about 5, or most preferably between about 4 and about 5. Without limiting the scope of invention, the numeric ranges are inclusive of the numbers defining the range and include each integer within the defined range.

Urea Solidification Agent

The solid compositions employ a matrix of urea and an acid. The urea is an organic compound having the formula $CO(NH_2)_2$ and can be provided as urea particles can also be employed as hardeners in the solid detergent compositions according to the present invention. The solidification rate of the compositions will vary, at least in part, to factors including, but not limited to: the amount, the particle size, and the shape of the urea added to the composition. The amount and particle size of the urea can vary by formulation to be combined with active components (e.g. cleaning agents and other ingredients) to form a homogeneous mixture without the application of heat from an external source to melt the urea and other ingredients to a molten stage. It is preferred that the amount of urea included in the solid composition is effective to provide a desired hardness and desired rate of solubility of the composition when placed in an aqueous medium to achieve a desired rate of dispensing the active components from the solid composition during use. In some embodiments, the solid compositions include between approximately 5% to approximately 95% by weight urea, between approximately 5% to approximately 90% by weight urea, between approximately 10% and approximately 70% by weight urea, between approximately 10% and approximately 60% by weight urea, between approximately 10% and approximately 50% by weight urea, and more particularly between approximately 10% and approximately 40% by weight urea.

Urea may be in the form of prilled beads or powder. Prilled urea is generally available from commercial sources as a mixture of particle sizes ranging from about 8-15 U.S. mesh, as for example, from Arcadian Sohio Company, Nitrogen Chemicals Division. A prilled form of urea is preferably milled to reduce the particle size to about 50 U.S. mesh to about 125 U.S. mesh, particularly about 75-100 U.S. mesh, preferably using a wet mill such as a single or twin-screw extruder, a Teledyne mixer, a Ross emulsifier, and the like.

Urea may be in the form of prilled beads or powder which are combined with an active component, such as a quaternary ammonium compound. A commercially available example is available under the tradename Stepan BTC 2125M, which is a 40% quaternary ammonium compound and 60% urea blend.

Additional Hardening or Solidification Agents

In some aspects, additional solidification agents can be employed in combination with the urea. Solidification agents may also be referred to as hardening agents. Additional solidification agents can include a compound or system of compounds, organic or inorganic, which significantly contribute to the uniform solidification of the solid composition. The solidification agents should be capable of forming a homogeneous matrix with the urea and acid complex and/or other active components of the solid composition when mixed and solidified to provide a uniform dissolution of the actives from the solid composition during use.

The additional solidification agents may be an organic hardening agent, including for example: a polyethylene glycol (PEG) compound, suitable examples including solid polyethylene glycols of the general formula H(OCH2CH2)nOH, where n is greater than 15, particularly approximately 30 to approximately 1700, such as PEG 4000, PEG 1450, and PEG 8000 among others. The additional solidification agents may be an inorganic hardening agent, including for example: hydratable inorganic salts, including, but not limited to carbonates, sulfates and bicarbonates, which may be an alkali metal or alkali earth metal salt. Suitable salts include lithium, sodium, potassium, calcium, magnesium, iron, strontium, zinc, manganese, lanthanum, titanium, gallium, aluminum, cobalt, copper, molybdenum, rhenium, rhodium, scandium, tin and zirconium. Suitable metal salts include sodium, lithium, potassium salts including, but not limited to sulfates, chlorides, phosphates, acetates, nitrates, and carbonates. Particularly useful metals salts include lithium, sodium and potassium sulfates, chlorides and acetates. The following patents disclose various combinations of solidification, binding and/or hardening agents that can be utilized in the solid cleaning compositions of the present invention. The following U.S. patents are incorporated herein by reference in their entirety: U.S. Pat. Nos. 7,153,820; 7,094,746; 7,087,569; 7,037,886; 6,831,054; 6,730,653; 6,660,707; 6,653,266; 6,583,094; 6,410,495; 6,258,765; 6,177,392; 6,156,715; 5,858,299; 5,316,688; 5,234,615; 5,198,198; 5,078,301; 4,595,520; 4,680,134; RE32,763; and RE32818.

In other aspects, no additional solidification agents are employed in combination with the urea.

Acids

The solid compositions employ a matrix of urea and an acid. Without being limited to a mechanism of action, the acid solubility and acidity (pKa) are important to the formulation of the solid complex. As the urea acts as a weak base, the acid can cause swelling of a solid composition unless the urea/acid are complexed in the solid composition. Various organic acids are suitable for use according to the solid compositions of the invention. Monocarboxylic and dicarboxylic acids can be employed. Exemplary organic acids include, for example, citric acid, glutamic acid, sulfamic acid, malic acid, maleic acid, tartaric acid, lactic acid, aspartic acid, succinic acid, adipic acid, hydroxyacetic (glycolic) acid, formic acid, acetic acid, propionic acid, butyric acid, valeric acid, caproic acid, gluconic acid, itaconic acid, trichloroacetic acid, benzoic acid, oxalic acid, malonic acid, succinic acid, glutaric acid, maleic acid, fumaric acid, adipic acid, terephthalic acids, among others, and including salts thereof. Combinations of these organic acids and their salts could also be employed. In a preferred embodiment the acid comprises one or more polyprotic acids and/or salts thereof.

In other embodiments, salts of the acids can further be employed, including for example monosodium citrate and dicarboxymethyl glutamic acid tetrasodium salt (GLDA).

In some embodiments, the acid can be a liquid or a solid acid.

In some embodiments, more than one acid is employed to form more than one solid complex with urea.

In some embodiments, the solid compositions include between approximately 5% to approximately 95% by weight acid, between approximately 5% to approximately 90% by weight acid, between approximately 10% and approximately 70% by weight acid, between approximately 10% and approximately 60% by weight acid, between approximately 10% and approximately 50% by weight acid, and more particularly between approximately 10% and approximately 40% by weight acid. In addition, without constituting a limitation, all ranges recited are inclusive of the numbers defining the range and include each integer within the defined range.

Quaternary Ammonium Compound

Exemplary formulated solid compositions according to the invention include at least one quaternary ammonium compound. Certain quaternary ammonium compounds are known to have antimicrobial activity. Accordingly, various quaternary ammonium compounds with antimicrobial activity can be used in the composition of the invention. In an aspect, the quaternary ammonium compound is an antimicrobial "quat." The term "quaternary ammonium compound" or "quat" generally refers to any composition with the following formula:

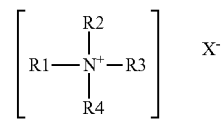

where R1-R4 are alkyl groups that may be alike or different, substituted or unsubstituted, saturated or unsaturated, branched or unbranched, and cyclic or acyclic and may contain ether, ester, or amide linkages; they may be aromatic or substituted aromatic groups. In an aspect, groups R1, R2, R3, and R4 each have C20 chain length or less. X− is an anionic counterion. The term "anionic counterion" includes any ion that can form a salt with quaternary ammonium.

Examples of suitable counterions include halides such as chlorides and bromides, propionates, methosulphates, saccharinates, ethosulphates, hydroxides, acetates, phosphates, carbonates (such as commercially available as Carboquat H, from Lonza), and nitrates. Preferably, the anionic counterion is chloride.

In some embodiments quaternary ammonium compounds having carbon chains of less than 20 are included in compositions of the invention. In other embodiments quaternary ammoniums having carbon chains of C6-C18, C12-C18, C12-C16 and C6-C10 are included in compositions of the invention. Examples of quaternary ammonium compounds useful in the present invention include but are not limited to alkyl dimethyl benzyl ammonium chloride, octyl decyl dimethyl ammonium chloride, dioctyl dimethyl ammonium chloride, and didecyl dimethyl ammonium chloride to name a few. A single quaternary ammonium compound or a combination of more than one quaternary ammonium compound may be included in embodiments of the solid compositions according to the invention. Further examples of quaternary ammonium compounds useful in the present invention include but are not limited to benzethonium chloride, ethylbenzyl alkonium chloride, myristyl trimethyl ammonium chloride, methyl benzethonium chloride, cetalkonium chloride, cetrimonium bromide (CTAB), camitine, dofanium chloride, tetraethyl ammonium bromide (TEAB), domiphen bromide, benzododecinium bromide, benzoxonium chloride, choline, cocamidopropyl betaine (CAPB), denatonium, and mixtures thereof.

In some embodiments depending on the nature of the R group, the anion, and the number of quaternary nitrogen atoms present, the antimicrobial quats may be classified into one of the following categories: monoalkyltrimethyl ammonium salts; monoalkyldimethylbenzyl ammonium salts; dialkyldimethyl ammonium salts; heteroaromatic ammonium salts; polysubstituted quaternary ammonium salts; bis-quaternary ammonium salts; and polymeric quaternary ammonium salts. Each category will be discussed herein.

Monoalkyltrimethyl ammonium salts contain one R group that is a long-chain alkyl group, and the remaining R groups are short-chain alkyl groups, such as methyl or ethyl groups. Some non-limiting examples of monoalkyltrimethyl ammonium salts include cetyltrimethylammonium bromide, commercial available under the tradenames Rhodaquat M242C/29 and Dehyquart A; alkyltrimethyl ammonium chloride, commercially available as Arquad 16; alkylaryltrimethyl ammonium chloride; and cetyldimethyl ethylammonium bromide, commercially available as Ammonyx DME.

Monoalkyldimethylbenzyl ammonium salts contain one R group that is a long-chain alkyl group, a second R group that is a benzyl radical, and the two remaining R groups are short-chain alkyl groups, such as methyl or ethyl groups. Monoalkyldimethylbenzyl ammonium salts are generally compatible with nonionic surfactants, detergent builders, perfumes, and other ingredients. Some non-limiting examples of monoalkyldimethylbenzyl ammonium salts include alkyldimethylbenzyl ammonium chlorides, commercially available as Barquat from Lonza Inc.; and benzethonium chloride, commercially available as Lonzagard, from Lonza Inc. Additionally, the monoalkyldimethylbenzyl ammonium salts may be substituted. Non-limiting examples of such salts include dodecyldimethyl-3,4-dichlorobenzyl ammonium chloride. Finally, there are mixtures of alkyldimethylbenzyl and alkyldimethyl substituted benzyl (ethylbenzyl) ammonium chlorides commercially available as BTC 2125M from Stepan Company, and Barquat 4250 from Lonza Inc.

Dialkyldimethyl ammonium salts contain two R groups that are long-chain alkyl groups, and the remaining R groups are short-chain alkyl groups, such as methyl groups. Some non-limiting examples of dialkyldimethyl ammonium salts include didecyldimethyl ammonium halides, commercially available as Bardac 22 from Lonza Inc.; didecyl dimethyl ammonium chloride commercially available as Bardac 2250 from Lonza Inc.; dioctyl dimethyl ammonium chloride, commercially available as Bardac LF and Bardac LF-80 from Lonza Inc.); and octyl decyl dimethyl ammonium chloride sold as a mixture with didecyl and dioctyl dimethyl ammonium chlorides, commercially available as Bardac2050 and 2080 from Lonza Inc.

Heteroaromatic ammonium salts contain one R group that is a long-chain alkyl group, and the remaining R groups are provided by some aromatic system. Accordingly, the quaternary nitrogen to which the R groups are attached is part of an aromatic system such as pyridine, quinoline, or isoquinoline. Some non-limiting examples of heteroaromatic ammonium salts include cetylpyridinium halide, commercially available as Sumquat 6060/CPC from Zeeland Chemical Inc.; 1-[3-chloroalkyl]-3,5,7-triaza-1-azoniaadamantane, commercially available as Dowicil 200 from The Dow Chemical Company; and alkyl-isoquinolinium bromide.

Polysubstituted quaternary ammonium salts are a monoalkyltrimethyl ammonium salt, monoalkyldimethylbenzyl ammonium salt, dialkyldimethyl ammonium salt, or heteroaromatic ammonium salt wherein the anion portion of the molecule is a large, high-molecular weight (MW) organic ion. Some non-limiting examples of polysubstituted quaternary ammonium salts include alkyldimethyl benzyl ammonium saccharinate, and dimethylethylbenzyl ammonium cyclohexylsulfamate.

Bis-quaternary ammonium salts contain two symmetric quaternary ammonium moieties having the general formula:

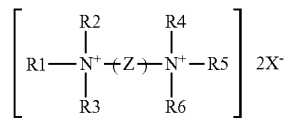

Where the R groups may be long or short chain alkyl, a benzyl radical or provided by an aromatic system. Z is a carbon-hydrogen chain attached to each quaternary nitrogen. Some non-limiting examples of bis-quaternary ammonium salts include 1,10-bis(2-methyl-4-aminoquinolinium chloride)-decane; and 1,6-bis[1-methyl-3-(2,2,6-trimethyl cyclohexyl)-propyldimethylammonium chloride] hexane or triclobisonium chloride.

In an aspect, the quaternary ammonium compound is a medium to long chain alkyl R group, such as from 8 carbons to about 20 carbons, from 8 carbons to about 18 carbons, from about 10 to about 18 carbons, and from about 12 to about 16 carbons, and providing a soluble and good antimicrobial agent.

In an aspect, the quaternary ammonium compound is a short di-alkyl chain quaternary ammonium compound having an R group, such as from 2 carbons to about 12 carbons, from 3 carbons to about 12 carbons, or from 6 carbons to about 12 carbons.

In a preferred aspect, the quaternary ammonium compound is an alkyl benzyl ammonium chloride, a dialkyl benzyl ammonium chloride, a blend of alkyl benzyl ammonium chloride and dialkyl benzyl ammonium chloride, didecyl dimethyl ammonium chloride, dioctyl dimethyl ammonium chloride, a blend of didecyl dimethyl ammonium chloride and dioctyl dimethyl ammonium chloride, or mixtures thereof. In a preferred embodiment the quaternary ammonium compound used in the antimicrobial compositions of the invention is comprised of a mixture of dialkyl quaternary ammonium and alkyl benzyl quaternary ammonium.

In an aspect, at least one of R1-R4 is alkoxylated, preferably ethoxylated and/or propoxylated, including a polyoxyalkylene chain of the following formulas:

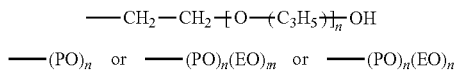

Wherein n is an integer up to 50, from 10-50, from 20-50, from 30-50, or from 35-45. Where a is an integer from 5 to 100 or 1 to 60 and b is an integer from 1 to 50 or 0 to 30 and a plus b is from 1 to 60 and a>b or a ratio of a/b be of at least 2 or 4 or 5.

In an aspect, at least one of R1-R4 is alkoxylated, including a polyoxyalkylene chain of the following formulas:

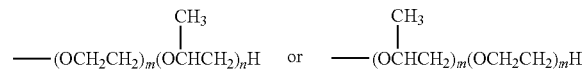

Wherein m is from 0 to 30, n is from 1 to 60, and m plus n is from 1 to 60, and n>m. In an aspect, a propoxylated quaternary ammonium compound according to the formula above where R1, R2 and R3 are independently lower alkyl groups ($C_1$-C4 alkyl groups), R4 may be a polyoxyalkylene chain, and X− comprises an anion. Additional disclosure of suitable propoxylated, non-polymeric quats suitable for the present disclosure is set forth in U.S. Pat. Nos. 6,878,681 and 7,951,245, which are herein incorporated by reference in their entirety. An example of a commercially-available propoxylated, non polymeric quat is Variquat CC42 NS (polyoxypropylene methyl diethyl ammonium chloride) having the formula $(C_3H_6O)n(C_7H_{18}NO)Cl$. In an aspect, the Variquat CC42 (polyoxypropylene methyl diethyl ammonium chloride) has an average chain length (n) from about 20-50, average of about 30.

In an aspect of the invention, the propoxylated quaternary ammonium compound has a total molecular weight of propylene oxide of at least about 60%.

The term "anionic counter ion" includes any ion that can form a salt with quaternary ammonium. Examples of suitable counter ions include halides such as chlorides and bromides, propionates, methosulphates, saccharinates, ethosulphates, hydroxides, acetates, phosphates, and nitrates. Preferably, the anionic counter ion is chloride.

In some embodiments, the quaternary ammonium compound is silane free. In preferred embodiments, the antimicrobial composition is provided including a silane free quaternary ammonium compound having a C20 chain length or less.

In a preferred embodiment, the quaternary ammonium compound may be selected based on its consideration or classification as a food additive. For example, the quaternary ammonium compound may include benzalkonium chloride and is therefore suitable for use in a sanitizing rinse for contact with food products.

In certain embodiments, an effective amount of the quaternary ammonium compound is provided in combination with the anionic surfactant to provide synergistic antimicrobial and sanitizing efficacy against a broad spectrum of microbes, including gram negative microbes such as E. coli. Suitable concentrations of the quaternary ammonium compound in such a use solution include at least about 10 ppm, at least about 50 ppm, or at least about 100 ppm, or at least about 150 ppm, or at least about 200 ppm, or at least about 250 ppm, or at least about 300 ppm, or from about 100-500 ppm, or from about 100-300 ppm, or any ranges therein. In some aspects, the activated microbial compositions according to the invention provide efficacy against gram negative bacteria at concentrations below the conventional requirement of more than 150 ppm quaternary ammonium compounds for any antimicrobial efficacy, and provide efficacy at concentrations below about 150 ppm, or below about 100 ppm according to the synergy in combination with the anionic surfactants and/or acids. Beneficially, the low actives of the quaternary ammonium compound are a result of the synergy with the anionic surfactant. Without constituting a limitation, all ranges recited are inclusive of the numbers defining the range and include each integer within the defined range.

In some embodiments, the solid compositions including a combination of the quaternary ammonium compound and anionic surfactant is provided in approximately a mole to mole ratio. In other aspects, the compositions include up to about a 10 to about a 1 molar ratio of quaternary ammonium compound and anionic surfactant. In another embodiment the sanitizing rinse compositions are provided with a molar ratio of anionic surfactant to quaternary ammonium of about 1 mole anionic surfactant to about 1 mole of quaternary ammonium compound. In another embodiment the composition is provided with a molar ratio of anionic surfactant to quaternary ammonium compound of about 1 mole anionic surfactant to about 4 mole of quaternary ammonium compound. In another embodiment the antimicrobial composition is provided with a molar ratio of anionic surfactant to quaternary ammonium compound of about 1.5 mole anionic surfactant to about 1 mole of quaternary ammonium compound. In another embodiment the antimicrobial composition is provided with a molar ratio of anionic surfactant to quaternary ammonium compound of about 1 mole anionic surfactant to about 10 moles of quaternary ammonium compound. In another embodiment the antimicrobial composition is provided with a molar ratio of anionic surfactant to quaternary ammonium compound of about 2 moles anionic surfactant to about 1 mole of quaternary ammonium compound.

According to embodiments of the invention, the quaternary ammonium compound may be provided in a concentrated composition in the amount between about 0.001 wt.-%-75 wt.-%, from about 0.1 wt.-%-75 wt.-%, from about 0.01 wt.-%-75 wt.-%, from about 1 wt.-%-75 wt.-%, from about 1 wt.-%-50 wt.-%, from about 1 wt.-%-30 wt.-%, from about 5 wt.-%-30 wt.-%. In addition, without being limited according to the invention, all ranges recited are inclusive of the numbers defining the range and include each integer within the defined range.

Anionic Surfactants

Exemplary formulated solid compositions according to the invention can include at least one anionic surfactant. Anionic surfactants are categorized as anionics because the charge on the hydrophobe is negative, or because the hydrophobic section of the molecule carries no charge unless the pH is elevated to neutrality or above (e.g. carboxylic acids).

Carboxylate, sulfonate, sulfate and phosphate are polar (hydrophilic) solubilizing groups found in anionic surfactants.

In an aspect, the anionic surfactant is linear or branched. In an aspect, the linear or branched anionic surfactant is a medium chain surfactant having from 6-20 carbon chain length, or from 6-18 carbon chain length, preferably from 6-12 carbon chain length, and more preferably from 6-10 carbon chain length. In an aspect, the linear or branched, medium chain anionic surfactant is alkoxylated. In an aspect, the linear or branched anionic surfactant is an alkoxylated medium chain surfactant having from 6-18 carbon chain length, preferably from 6-13 carbon chain length, and more preferably from 6-10 carbon. In an aspect, the anionic surfactant is a carboxylate. In an alternative aspect, the anionic surfactant is a weak acid anionic, such as a phosphate ester. In a still further alternative aspect, the anionic surfactant is a sulfonate and/or sulfate. In still further aspect, the anionic surfactant used in combination with the quaternary ammonium is alkoxylated or un-alkoxylated and may be a primary linear chain or branched chain carboxylate.

In an aspect, the anionic surfactant suitable for use in the present compositions to activate the synergy and enhanced surface activity of the quaternary ammonium compound includes carboxylates. Anionic carboxylate surfactants suitable for use in the present compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Suitable carboxylic acids include for example decanoic acid, octanoic acid, nonanoic, ethylhexyl acid, and isononanionic acid. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula: R—O—(CH$_2$CH$_2$O)$_n$(CH$_2$)$_m$—CO$_2$X in which R is a C8-C22 alkyl group or

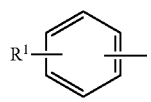

in which R$^1$ is a C4-C16 alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a C8-C16 alkyl group. In some embodiments, R is a C12-C14 alkyl group, n is 4, and m is 1.

Such alkyl and alkylaryl ethoxy carboxylates are commercially available. These ethoxy carboxylates are typically available as the acid forms, which can be readily converted to the anionic or salt form.

In an aspect, the carboxylate-based anionic surfactant provides improved antimicrobial activity. Examples of preferred activating anionic surfactants include carboxylates having a carbon chain of C6-C10. Examples of anionic carboxylate surfactants include organic acids such as hexanoic acid, heptanoic acid, octanoic acid, nonanoic acid, and decanoic acid. Examples of branched chain organic acids include ethylhexyl carboxylate and tridecyl carboxylate. Examples of commercially available surfactants include Marlowet 4539 (C9-alcohol polyethylene glycol ether carboxylic acid available from Sasol), Emulsogen CNO (C8-alcohol 8 moles polyethylene glycol ether carboxylic acid available from Clariant), and Emulsogen DTC (C13-alcohol 7 moles polyethylene glycol ether carboxylic acid available from Clariant), and others.

In an aspect, the anionic surfactants suitable for use in the present compositions to activate the microbial synergy and enhance surface activity (as measured by a reduction in dynamic surface tension) of the quaternary ammonium compound further include phosphate esters.

In an aspect, the anionic surfactants suitable for use in the present compositions include sulfonates and/or sulfates. In an aspect, the anionic surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the C5-C17 acyl-N—(C1-C4 alkyl) and —N—(C1-C2 hydroxyalkyl) glucamine sulfates, and sulfates of alkylpolysaccharides such as the sulfates of alkylpolyglucoside, and the like. Also included are the alkyl sulfates, alkyl poly (ethyleneoxy) ether sulfates and aromatic poly(ethyleneoxy) sulfates such as the sulfates or condensation products of ethylene oxide and nonyl phenol (usually having 1 to 6 oxyethylene groups per molecule). Anionic sulfonate surfactants suitable for use in the present compositions also include alkyl sulfonates, the linear and branched primary and secondary alkyl sulfonates, and the aromatic sulfonates with or without substituents.

In an aspect, the sulfated and sulfonated anionic surfactants provide decreased or inactivated surface activity of the quaternary ammonium compound. Sulfated and sulfonated anionic surfactants having a stronger ionic bond serve to deactivate the antimicrobial efficacy of quaternary ammonium compounds, whereas anionic surfactants with weaker ionic bonds serve to enhance or activate the antimicrobial efficacy of quaternary ammonium compounds. Examples of commercially available sulfate or sulfonated anionic surfactants include X-AES (C12-14-(PO)$_{16}$-(EO)$_2$-sulfate available from Huntsman Chemical), SLS (sodium lauryl sulfate), SLES (sodium lauryl ether sulfate), LAS (linear alkyl benzyl sulfonate), and AOS (alpha olefin sulfonate).

As described herein according to the invention, the ability of a combination of a quaternary ammonium compound and an anionic surfactant to either enhance or deactivate the antimicrobial efficacy can be predicted based upon its surface activity. That is, if a combination is highly surface active as compared to another combination (which indicates the quaternary ammonium compound is water soluble and therefore available for surface activity and antimicrobial action), the combination having the highest surface activity enhances the antimicrobial efficacy of the quaternary ammonium. In contrast, if a combination has lower surface activity as compared to another combination, the combination having the low surface activity neutralizes or deactivates the antimicrobial efficacy of the quaternary ammonium.

In an aspect of the invention, the antimicrobial efficacy of a composition may be dialed up or down depending upon the anionic surfactant employed. Accordingly, a method of modulating antimicrobial activity of a quaternary ammonium compound is provided.

Examples of anionic carboxylate surfactants suitable for use in the various compositions include organic acids such as hexanoic acid, heptanoic acid, octanoic acid, nonanoic acid, and decanoic acid. Examples of branched chain organic acids suitable for use in the compositions include ethylhexyl carboxylate, isononanoic carboxylate, and tridecyl carboxylate. Examples of commercially available surfactants suitable for use in the 2-in-1 sanitizing rinse compositions include organic acids such as hexanoic acid, heptanoic acid, octanoic acid, nonanoic acid, decanoic acid, Colatrope INC, Isononanionic acid, Marlowet 4539 (C9-alcohol polyethylene glycol ether carboxylic acid available from Sasol), Emulsogen CNO (C8-alcohol 8 moles polyethylene glycol ether carboxylic acid available from Clariant), and Emulsogen DTC (C13-alcohol 7 moles polyethylene glycol ether carboxylic acid available from Clariant). It is further discovered that phosphate esters serve to enhance the antimicrobial activity of a quaternary ammonium compound and are therefore suitable for use in the compositions.

Anionic polymers and/or chelants can also be employed in the solid compositions. Exemplary disclosure is set forth in U.S. application Ser. No. 15/444,587 titled Interaction between Antimicrobial Quaternary Ammonium Compounds and Anionic Surfactants, which is herein incorporated by reference in its entirety.

An effective amount of the anionic surfactant is provided in combination with the quaternary ammonium compound to provide synergistic antimicrobial and/or sanitizing efficacy. Suitable concentrations of the anionic surfactant in a use solution include between about 1 ppm and about 5,000 ppm, about 15 ppm and about 2,500 ppm, about 1 ppm and about 1,000 ppm, about 1 ppm and about 100 ppm, about 1 ppm and about 50 ppm, or about 1 ppm and about 25 ppm. Without constituting a limitation, all ranges recited are inclusive of the numbers defining the range and include each integer within the defined range.

According to some embodiments, the anionic surfactant may be provided in a concentrated composition in the amount between about 0.0001 wt.-% to about 50 wt.-%, from about 0.001 wt.-% to about 50 wt.-%, from about 0.01 wt.-% to about 50 wt.-%, from about 0.1 wt.-% to about 50 wt.-%, from about 0.1 wt.-% to about 30 wt.-%, from about 1 wt.-% to about 30 wt.-%, from about 0.1 wt.-% to about 20 wt.-%, or from about 1 wt.-% to about 20 wt.-%. In addition, without constituting a limitation, all ranges recited are inclusive of the numbers defining the range and include each integer within the defined range. As one skilled in the art will ascertain from the disclosure of the present invention, the concentrations for the anionic surfactant and/or acid in combination with the quaternary ammonium compound will vary depending upon, for example, the type of anionic surfactant (e.g. selected for activation versus inactivation), quaternary ammonium compound concentration (molar ratio) and the additional components in the solution of the composition.

Nonionic Surfactants

Exemplary formulated solid compositions according to the invention can include at least one nonionic surfactant. Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide, or a polyhydration product thereof, e.g., polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties.

1. Useful nonionic surfactants include block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronic® manufactured by BASF Corp. Pluronic® compounds are difunctional (two reactive hydrogens) compounds formed by condensing ethylene oxide with a hydrophobic base and the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Tetronic® compounds are tetra-functional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

2. Condensation products of one mole of alkyl phenol wherein the alkyl chain, of straight chain or branched chain configuration, or of a single or dual alkyl constituent, contains from about 8 to about 18 carbon atoms with from about 3 to about 50 moles of ethylene oxide may be used. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhodia and Triton® manufactured bow Chemical Company.

3. Condensation products of one mole of a saturated or unsaturated, straight or branched chain alcohol having from about 6 to about 24 carbon atoms with from about 3 to about 50 moles of ethylene oxide may be used. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Sasol North America Inc.

4. Condensation products of one mole of saturated or unsaturated, straight or branched chain carboxylic acid having from about 8 to about 18 carbon atoms with from about 6 to about 50 moles of ethylene oxide may be used. The acid moiety can consist of mixtures of acids in the above defined carbon atoms range or it can consist of an acid having a specific number of carbon atoms within the range.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols may be used for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics® are manufactured by BASF Corporation under the trade name Pluronic® surfactants. Likewise, the Tetronic® surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat. No. 2,903,486 issued Sep. 8, 1959 to Brown et al. and represented by the formula

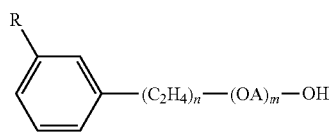

in which R is an alkyl group of 8 to 9 carbon atoms, A is an alkylene chain of 3 to 4 carbon atoms, n is an integer of 7 to 16, and mn is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n (C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n (C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n (C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; R2 is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

10. The ethoxylated $C_6$-Cis fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or —$(C_2H_4O)_xH$, where x is in the range of from 1 to 3.

13. A useful class of non-ionic surfactants include the class defined as alkoxylated amines or, most particularly, alcohol alkoxylated/aminated/alkoxylated surfactants. These non-ionic surfactants may be at least in part represented by the general formulae: $R^{20}$—$(PO)_sN$-$(EO)_tH$, $R^{20}$—$(PO)_sN$-$(EO)_tH(EO)_tH$, and $R^{20}$—$N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}$—$(PO)_v$—$N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic® PEA 25 Amine Alkoxylate. Preferred nonionic surfactants for the compositions of the invention include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Semi-Polar Nonionic Surfactants

The semi-polar type of nonionic surface active agents are another class of nonionic surfactant useful in compositions of the present invention. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives.

14. Amine oxides are tertiary amine oxides corresponding to the general formula:

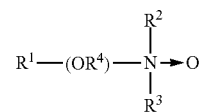

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, R is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

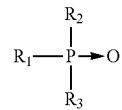

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

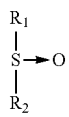

wherein the arrow is a conventional representation of a semi-polar bond; and, R1 is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic® and reverse Pluronic® surfactants; alcohol alkoxylates, such as Dehypon® LS-54 (R-(EO)$_5$(PO)$_4$) and Dehypon® LS-36 (R-(EO)$_3$(PO)$_6$); and capped alcohol alkoxylates, such as Plurafac® LF221 and Tegoten® EC11; mixtures thereof, or the like.

According to embodiments of the invention, the nonionic surfactants may be provided in a concentrated composition in the amount between about 0.0001 wt.-% to about 50 wt.-%, from about 0.001 wt.-% to about 50 wt.-%, from about 0.01 wt.-% to about 50 wt.-%, from about 0.1 wt.-% to about 50 wt.-%, from about 0.1 wt.-% to about 30 wt.-%, from about 1 wt.-% to about 30 wt.-%, from about 0.1 wt.-% to about 20 wt.-%, or from about 1 wt.-% to about 20 wt.-%. In addition, without being limited according to the invention, all ranges recited are inclusive of the numbers defining the range and include each integer within the defined range.

Additional Optional Ingredients

The components of the compositions can further be combined with various functional components. In some embodiments, the compositions including the urea and acid solid complex make up a large amount, or even substantially all of the total weight of the composition. For example, in some embodiments few or no additional functional ingredients are disposed therein. In other embodiments, additional functional ingredients may be included in the compositions. The functional ingredients provide desired properties and functionalities to the compositions. For the purpose of this application, the term "functional ingredient" includes a material that when dispersed or dissolved in the aqueous use solution provides a beneficial property in a particular use. Some particular examples of functional materials are discussed in more detail below, although the particular materials discussed are given by way of example only, and that a broad variety of other functional ingredients may be used.

In some embodiments, the compositions may include additional functional ingredients including, for example, additional surfactants, including nonionic surfactants, thickeners and/or viscosity modifiers, solvents, solubility modifiers, humectants, metal protecting agents, stabilizing agents, corrosion inhibitors, sequestrants and/or chelating agents, solidifying agent, sheeting agents, pH modifying components, including alkalinity and/or acidity sources, aesthetic enhancing agents (i.e., colorants, odorants, or perfumes), other cleaning agents, hydrotropes or couplers, buffers, and the like.

Alkalinity and/or Acidity Source

In some embodiments, the compositions of the present invention include an alkalinity source and/or acidulant. In a preferred embodiment, the compositions of the present invention include an acidulant. The acidulant can be effective to form a concentrate composition or a use solution with a desired acidic to neutral pH. The acidulant can be effective to form a use composition with pH of about 7, about 6 or less, about 5 or less, about 4, about 4 or less, about 3, about 3 or less, about 2, about 2 or less, or the like. In some embodiments, depending on the anionic surfactant employed in the composition, an acidulant is included in the composition. In an embodiment, an acidulant is employed in combination with linear short chain carboxylates (e.g. pH 3-5) and/or for branched/alkoxylated carboxylates having a broader pH.

In an embodiment, the acidulant includes an inorganic acid. Suitable inorganic acids include, but are not limited to, sulfuric acid, sodium bisulfate, phosphoric acid, nitric acid, hydrochloric acid. In some embodiments, the acidulant includes an organic acid. Suitable organic acids include, but are not limited to, methane sulfonic acid, ethane sulfonic acid, propane sulfonic acid, butane sulfonic acid, xylene sulfonic acid, benzene sulfonic acid, formic acid, acetic acid, mono, di, or tri-carboxylic acids (succinic, citric), picolinic acid, dipicolinic acid, and mixtures thereof. In some embodiments, the compositions of the present invention are free or substantially free of a phosphorous based acid. In some embodiments, the acidulant selected can also function as a stabilizing agent. Thus, the compositions of the present invention can be substantially free of an additional stabilizing agent.

In certain embodiments, the present composition includes about 0 to about 80 wt-% acidulant, about 0.5 wt-% to about 80 wt-% alkalinity source and/or acidulant, about 0.1 to about 50 wt %, about 1 to about 50 wt %, or about 5 to about 30 wt-% alkalinity source and/or acidulant. It is to be understood that all values and ranges between these values and ranges are encompassed by the compositions disclosed herein.

Stabilizing Agents

In some embodiments, the compositions of the present invention include one or more stabilizing agents. In some embodiments, an acidic stabilizing agent can be used. Thus, in some embodiments, the compositions of the present invention can be substantially free of an additional acidulant. Suitable stabilizing agents include, for example, chelating agents or sequestrants. Suitable sequestrants include, but are not limited to, organic chelating compounds that sequester metal ions in solution, particularly transition metal ions. Such sequestrants include organic amino- or hydroxy-polyphosphonic acid complexing agents (either in acid or soluble salt forms), carboxylic acids (e.g., polymeric polycarboxylate), hydroxycarboxylic acids, aminocarboxylic acids, or heterocyclic carboxylic acids, e.g., pyridine-2, 6-dicarboxylic acid (dipicolinic acid).

In some embodiments, the compositions of the present invention include dipicolinic acid as a stabilizing agent. Compositions including dipicolinic acid can be formulated to be free or substantially free of phosphorous. It has also been observed that the inclusion of dipicolinic acid in a composition of the present invention aids in achieving the phase stability of the compositions, compared to other conventional stabilizing agents, e.g., 1-hydroxy ethylidene-1,1-diphosphonic acid ($CH_3C(PO_3H_2)_2OH$) (HEDP).

In other embodiments, the sequestrant can be or include phosphonic acid or a phosphonate salt. Suitable phosphonic acids and phosphonate salts include HEDP; ethylenediamine tetrakis methylenephosphonic acid (EDTMP); diethylenetriamine pentakis methylenephosphonic acid (DTPMP); cyclohexane-1,2-tetramethylene phosphonic acid; amino[tri(methylene phosphonic acid)]; (ethylene diamine[tetra methylene-phosphonic acid)]; 2-phosphene butane-1,2,4-tricarboxylic acid; or salts thereof, such as the alkali metal salts, ammonium salts, or alkyloyl amine salts, such as mono-, di-, or tetra-ethanolamine salts; picolinic, dipicolinic acid or mixtures thereof. In some embodiments, organic phosphonates, e.g, HEDP are included in the compositions of the present invention. Commercially available food additive chelating agents include phosphonates sold under the trade name DEQUEST® including, for example, 1-hydroxyethylidene-1, 1-diphosphonic acid, available from Monsanto Industrial Chemicals Co., St. Louis, MO, as DEQUEST® 2010; amino(tri(methylenephosphonic acid)), ($N[CH_2PO_3H_2]3$), available from Monsanto as DEQUEST® 2000; ethylenediamine[tetra(methylenephosphonic acid)] available from Monsanto as DEQUEST® 2041; and 2-phosphonobutane-1,2,4-tricarboxylic acid available from Mobay Chemical Corporation, Inorganic Chemicals Division, Pittsburgh, PA, as Bayhibit AM.

The sequestrant can be or include aminocarboxylic acid type sequestrants. Suitable aminocarboxylic acid type sequestrants include the acids or alkali metal salts thereof, e.g., amino acetates and salts thereof. Suitable aminocarboxylates include N-hydroxyethylaminodiacetic acid; hydroxyethylenediaminetetraacetic acid, nitrilotriacetic acid (NTA); ethylenediaminetetraacetic acid (EDTA); N-hydroxyethyl-ethylenediaminetriacetic acid (HEDTA); diethylenetriaminepentaacetic acid (DTPA); and Alanine-N,N-diacetic acid, and the like, and mixtures thereof.

The sequestrant can be or include a polycarboxylate. Suitable polycarboxylates include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed poly amide-methacrylamide copolymers, hydrolyzed poly acrylonitrile, hydrolyzed polymethacrylonitrile, hydrolyzed acrylonitrile-methacrylonitrile copolymers, polymaleic acid, polyfumaric acid, copolymers of acrylic and itaconic acid, phosphino polycarboxylate, acid or salt forms thereof, mixtures thereof, and the like.

In certain embodiments, the present composition includes about 0 to about 10 wt-% stabilizing agent, about 0.01 to about 10 wt-% stabilizing agent, about 0.4 to about 4 wt-% stabilizing agent, about 0.6 to about 3 wt-% stabilizing agent, about 1 to about 2 wt-% stabilizing agent. It is to be understood that all values and ranges within these values and ranges are encompassed herein.

Wetting or Defoaming Agents

Also useful in the compositions of the invention are wetting and defoaming agents. Wetting agents function to increase the surface contact or penetration activity of a composition of the invention. Wetting agents which can be used in the composition of the invention include any of those constituents known within the art to raise the surface activity of the composition of the invention. Generally, defoamers which can be used in accordance with the invention preferably include alcohol alkoxylates and EO/PO block copolymers. In some embodiments, the compositions of the present invention can include antifoaming agents or defoamers which are of food grade quality given the application of the method of the invention. To this end, one of the more effective antifoaming agents includes silicones. Silicones such as dimethyl silicone, glycol polysiloxane, methylphenol polysiloxane, trialkyl or tetralkyl silanes, hydrophobic silica defoamers and mixtures thereof can all be used in defoaming applications. Commercial defoamers commonly available include silicones such as Ardefoam® from Armour Industrial Chemical Company which is a silicone bound in an organic emulsion; Foam Kill® or Kresseo® available from Krusable Chemical Company which are silicone and non-silicone type defoamers as well as silicone esters; and Anti-Foam A® and DC-200 from Dow Corning Corporation which are both food grade type silicones among others. These defoamers can be present at a concentration range from about 0.01 wt-% to 20 wt-%, 0.01 wt-% to 20 wt-%, from about 0.01 wt-% to 5 wt-%, or from about 0.01 wt-% to about 1 wt-%. It is to be understood that all values and ranges within these values and ranges are encompassed herein.

Thickening or Gelling Agents

The compositions of the present invention can include any of a variety of known thickeners. Suitable thickeners include natural gums such as xanthan gum, guar gum, or other gums from plant mucilage; polysaccharide based thickeners, such as alginates, starches, and cellulosic polymers (e.g., carboxymethyl cellulose); polyacrylates thickeners; and hydrocolloid thickeners, such as pectin. In an embodiment, the thickener does not leave contaminating residue on the surface of an object. For example, the thickeners or gelling agents can be compatible with food or other sensitive products in contact areas. Generally, the concentration of thickener employed in the present compositions or methods will be dictated by the desired viscosity within the final composition. However, as a general guideline, the viscosity of thickener within the present composition ranges from about 0.1 wt-% to about 5 wt-%, from about 0.1 wt-% to about 1.0 wt-%, or from about 0.1 wt-% to about 0.5 wt-%. It is to be understood that all values and ranges within these values and ranges are encompassed herein.

Additional Surfactants

The compositions according to the invention may include one or more additional surfactants.

Sequestrants

The composition can contain an organic or inorganic sequestrants or mixtures of sequestrants. Organic sequestrants such as sodium citrate, the alkali metal salts of nitrilotriacetic acid (NTA), dicarboxymethyl glutamic acid tetrasodium salt (GLDA), EDTA, alkali metal gluconates, polyelectrolytes such as a polyacrylic acid, and the like can be used herein. The most preferred sequestrants are organic sequestrants such as sodium gluconate due to the compatibility of the sequestrant with the formulation base.

The present invention can also incorporate sequestrants to include materials such as complex phosphate sequestrants, including sodium tripolyphosphate, sodium hexametaphosphate, and the like, as well as mixtures thereof. In these phosphates, the sodium condensed phosphate hardness sequestering agent component functions as a water softener, a cleaner, and a detergent builder. Alkali metal (M) linear and cyclic condensed phosphates commonly have a $M_2O:P_2O_5$ mole ratio of about 1:1 to 2:1 and greater. Typical polyphosphates of this kind are the preferred sodium tripolyphosphate, sodium hexametaphosphate, sodium metaphosphate as well as corresponding potassium salts of these phosphates and mixtures thereof. The particle size of the phosphate is not critical, and any finely divided or granular commercially available product can be employed.

Solidification Agents or Hardening Agents

If it is desirous to prepare compositions of the invention as a solid, a solidification agent may be included into the composition. In some embodiments, the solidification agent can form and/or maintain the composition as a solid rinse aid composition. In other embodiments, the solidification agent can solidify the composition without unacceptably detracting from the eventual release of the active ingredients. The solidification agent can include, for example, an organic or inorganic solid compound having a neutral inert character or making a functional, stabilizing or detersive contribution to the present composition. Suitable solidification agents include solid polyethylene glycol (PEG), solid polypropylene glycol, solid EO/PO block copolymer, amide, urea (also known as carbamide), nonionic surfactant (which can be employed with a coupler), anionic surfactant, starch that has been made water-soluble (e.g., through an acid or alkaline treatment process), cellulose that has been made water-soluble, inorganic agent, poly(maleic anhydride/methyl vinyl ether), polymethacrylic acid, other generally functional or inert materials with high melting points, mixtures thereof, and the like.

Suitable glycol solidification agents include a solid polyethylene glycol or a solid polypropylene glycol, which can, for example, have molecular weight of about 1,400 to about 30,000. In certain embodiments, the solidification agent includes or is solid PEG, for example PEG 1500 up to PEG 20,000. In certain embodiments, the PEG includes PEG 1450, PEG 3350, PEG 4500, PEG 8000, PEG 20,000, and the like. Suitable solid polyethylene glycols are commercially available from Union Carbide under the tradename CARBOWAX.

Suitable amide solidification agents include stearic monoethanolamide, lauric diethanolamide, stearic diethanolamide, stearic monoethanol amide, cocodiethylene amide, an alkylamide, mixtures thereof, and the like. In an embodiment, the present composition can include glycol (e.g., PEG) and amide.

Suitable inorganic solidification agents include phosphate salt (e.g., alkali metal phosphate), sulfate salt (e.g., magnesium sulfate, sodium sulfate or sodium bisulfate), acetate salt (e.g., anhydrous sodium acetate), Borates (e.g., sodium borate), Silicates (e.g., the precipitated or fumed forms (e.g., Sipernat 50® available from Degussa), carbonate salt (e.g., calcium carbonate or carbonate hydrate), other known hydratable compounds, mixtures thereof, and the like. In an embodiment, the inorganic solidification agent can include organic phosphonate compounds and carbonate salts, such as an E-Form composition.

In some embodiments, any agent or combination of agents that provide a requisite degree of solidification and aqueous solubility can be included in the present compositions. In other embodiments, increasing the concentration of the solidification agent can tend to increase the hardness of the composition. In yet other embodiments, decreasing the concentration of solidification agent can tend to loosen or soften the concentrate composition.

In some embodiments, the solidification agent can include any organic or inorganic compound that imparts a solid character to and/or controls the soluble character of the present composition, for example, when placed in an aqueous environment. For example, a solidifying agent can provide controlled dispensing if it has greater aqueous solubility compared to other ingredients in the composition. Urea can be one such solidification agent. By way of further example, for systems that can benefit from less aqueous solubility or a slower rate of dissolution, an organic nonionic or amide hardening agent may be appropriate.

In some embodiments, the compositions of the present invention can include a solidification agent that provides for convenient processing or manufacture of the present composition. For example, the solidification agent can be selected to form a composition that can harden to a solid form under ambient temperatures of about 30° C. to about 50° C. after mixing ceases and the mixture is dispensed from the mixing system, within about 1 minute to about 3 hours, or about 2 minutes to about 2 hours, or about 5 minutes to about 1 hour.

In an exemplary aspect, a solid rinse aid may include an effective amount of solidification agents or a hardening agents, for example, urea, which vary the solubility of the composition in an aqueous medium during use such that the rinse aid and/or other active ingredients may be dispensed from the solid composition over an extended period of time. The composition may include a hardening agent in the range of up to about 50 wt-%. In other embodiments, the hardening agent may be present in amount from about 20 wt-% to about 40 wt %, or in the range of about 5 to about 15 wt-%.

The compositions of the present invention can include solidification agents at any effective amount. The amount of solidification agent included in the present composition can vary according to the type of composition, the ingredients of the composition, the intended use of the composition, the quantity of dispensing solution applied to the solid composition over time during use, the temperature of the dispensing solution, the hardness of the dispensing solution, the physical size of the solid composition, the concentration of the other ingredients, the concentration of the cleaning agent in the composition, and other like factors. Suitable amounts can include about 1 to about 99 wt-%, about 1.5 to about 85 wt-%, about 2 to about 80 wt-%, about 10 to about 45 wt-%, about 15 to about 40 wt-%, about 20 to about 30 wt-%, about 30 to about 70 wt-%, about 40 to about 60 wt-%, up to about 50 wt-%, about 40 to about 50 wt-%.

Use Compositions

The solid compositions are conventionally provided as solid concentrate compositions which may then be diluted to form use compositions for the various applications of use thereof. In general, a concentrate refers to a composition that is intended to be diluted with water to provide a use solution that contacts a surface and/or product in need of treatment to provide the desired rinsing, cleaning, sanitizing or the like. The solid compositions diluted for a use composition that contacts the surface and/or product in need of treatment can be referred to as a concentrate or a use composition (or use solution) dependent upon the formulation employed in the methods according to the invention. It should be understood that the concentration of the active components for the desired rinsing, cleaning, sanitizing or the like will vary depending on whether the composition is provided as a concentrate or as a use solution. For example, in an embodiment employing a solid antimicrobial and/or sanitizing composition with quaternary ammonium compound and anionic surfactant in the composition, the active levels of these components will vary dependent upon the formulation and level of concentration thereof.

For the various solid compositions employing the urea/acid complex according to the disclosure, a use solution may be prepared from the concentrate by diluting the concentrate with water at a dilution ratio that provides a use solution having desired rinsing, cleaning, sanitizing and/or other antimicrobial properties. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:100 and about 1:1,000 concentrate to water, or about 1:100 and about 1:500 concentrate to water. Without limiting the scope of invention, the numeric ranges are inclusive of the numbers defining the range and include each integer within the defined range.

In preferred embodiments the present invention includes concentrate compositions and use compositions. In an embodiment, a concentrate composition can be diluted to a use solution before applying to an object or a surface. The concentrate can be marketed and an end user can dilute the concentrate with water or an aqueous diluent to a use solution. The level of active components in the concentrate composition is dependent on the intended dilution factor and the desired activity of the composition. Generally, a dilution of about 1 fluid ounce to about 10 gallons of water to about 10 fluid ounces to about 1 gallon of water is used for aqueous compositions of the present invention. In some embodiments, higher use dilutions can be employed if elevated use temperature (greater than 25° C.) or extended exposure time (greater than 30 seconds) can be employed. In the typical use locus, the concentrate is diluted with a major proportion of water using commonly available tap or service water mixing the materials at a dilution ratio of about 3 to about 40 ounces of concentrate per 100 gallons of water. Without limiting the scope, the numeric ranges are inclusive of the numbers defining the range and include each integer within the defined range.

In some embodiments, the concentrated compositions can be diluted at a dilution ratio of about 0.1 g/L to about 100 g/L concentrate to diluent, about 0.5 g/L to about 10.0 g/L concentrate to diluent, about 1.0 g/L to about 4.0 g/L concentrate to diluent, or about 1.0 g/L to about 2.0 g/L concentrate to diluent. Without limiting the scope, the numeric ranges are inclusive of the numbers defining the range and include each integer within the defined range.

In other embodiments, a use composition can include about 0.01 to about 10 wt-% of a concentrate composition and about 90 to about 99.99 wt-% diluent; or about 0.1 to about 1 wt-% of a concentrate composition and about 99 to about 99.9 wt-% diluent. Without limiting the scope, the numeric ranges are inclusive of the numbers defining the range and include each integer within the defined range. Amounts of an ingredient in a use composition can be calculated from the amounts listed above for concentrate compositions and these dilution factors.

Methods and Applications of Use

The various solid compositions according to the present invention are particularly useful in cleaning and/or sanitizing applications. Such applications include, but are not limited to: machine and manual warewashing, presoaks, laundry and textile cleaning and destaining, carpet cleaning and destaining, vehicle cleaning and care applications, surface cleaning and destaining, kitchen and bath cleaning and destaining, floor cleaning and destaining, cleaning in place operations, general purpose cleaning and destaining, industrial or household cleaners, and pest control agents. The various solid compositions according to the present invention are also useful in rinsing applications.

In some embodiments the solid compositions can include an antimicrobial and/or sanitizing cleaning and/or rinse compositions according to the invention by comprising the urea, acid, quaternary ammonium compounds and anionic surfactants. Exemplary combinations of the antimicrobial and/or sanitizing cleaning and/or rinse compositions employing the quaternary ammonium compounds and anionic surfactants are further disclosed in U.S. patent application Ser. No. 15/445,513 titled "Sanitizing Rinse Based On Quat-Anionic Surfactant Synergy", Ser. No. 15/445,431 titled "Interaction Between Quaternary Compounds and Anionic Surfactants—Foam Enhancement and Stabilization and Preferred Foaming Antimicrobial Compositions," and Ser. No. 15/444,987 titled "Interaction between Antimicrobial Quaternary Ammonium Compounds and Anionic Surfactants," which are herein incorporated by reference in their entirety.

In some embodiments the solid compositions can provide a rinse aid or composition to provide a reduced surface tension of the aqueous solutions, or use solution, according to the invention. In an aspect, the surface tension is reduced to less than about 35 dynes/cm, and preferably between about 35 and about 15 dynes/cm. In another aspect, the surface tension is reduced to less than about 35 dynes/cm, less than about 30 dynes/cm, less than about 25 dynes/cm, or less than about 20 dynes/cm. In some embodiments the solid compositions as rinse aids or compositions can further provide a reduction in contact angle on the surface wetted with the compositions of the invention in comparison to contact angle of a conventional rinse aid composition, including reducing the contact angle of the composition by at least 5 degrees, or preferably at least 10 degrees or most preferably the contact angle is reduced by at least 15 degrees in comparison to contact angle of a conventional rinse aid composition. In a further aspect, the solid compositions as rinse aids or compositions provide a contact angle of less than about 40 degrees, from about 30 to about 40 degrees, less than about 30 degrees, less than about 20 degrees, or most preferably less than about 15 degrees.

In various embodiments, the solid compositions as cleaning, sanitizing and/or rinsing compositions can be used as a hard surface cleaner and/or sanitizer, food contact sanitizer (including direct or indirect contact sanitizer), tissue contact sanitizer (including for example fruits and vegetables), fast drying sanitizer for various hard surfaces (including for example healthcare surfaces, instruments, food and/or beverage surfaces, processing surfaces, and the like), any-streaking or smearing hard surface sanitizer, and the like. The present methods can be used in the methods, processes or procedures described and/or claimed in U.S. Pat. Nos. 5,200,189, 5,314,687, 5,718,910, 6,165,483, 6,238,685B1, 8,017,409 and 8,236,573, each of which are herein incorporated by reference in their entirety.

The solid compositions as cleaning compositions and methods of employing the same can be employed for various warewashing applications. Suitable methods for warewashing are set forth in U.S. Pat. No. 5,578,134 which is herein incorporated by reference in its entirety. Exemplary articles in the warewashing industry that can be treated with a sanitizing rinse aid composition according to the invention include plastics, dishware, cups, glasses, flatware, and cookware. For the purposes of this invention, the terms "dish" and "ware" are used in the broadest sense to refer to various types of articles used in the preparation, serving, consumption, and disposal of food stuffs including pots, pans, trays, pitchers, bowls, plates, saucers, cups, glasses, forks, knives, spoons, spatulas, and other glass, metal, ceramic, plastic composite articles commonly available in the institutional or household kitchen or dining room. In general, these types of articles can be referred to as food or beverage contacting articles because they have surfaces which are provided for contacting food and/or beverage. When used in these warewashing applications, the rinse aid should provide effective sheeting action and low foaming (or non-foaming) properties. In addition to having the desirable properties described above, it may also be useful for the sanitizing rinse aid composition to be biodegradable, environmentally friendly, and generally nontoxic. A rinse aid of this type may be described as being "food grade".

The solid compositions and methods of use are suitable for treating a variety of surfaces, products and/or target in addition to ware. For example, these may include a food item or a plant item and/or at least a portion of a medium, a container, an equipment, a system or a facility for growing, holding, processing, packaging, storing, transporting, preparing, cooking or serving the food item or the plant item. The present methods can be used for treating any suitable plant item. In some embodiments, the plant item is a grain, fruit, vegetable or flower plant item, a living plant item or a harvested plant item. In addition, the present methods can be used for treating any suitable food item, e.g., an animal product, an animal carcass or an egg, a fruit item, a vegetable item, or a grain item. In still other embodiments, the food item may include a fruit, grain and/or vegetable item.

In a still further embodiment, the solid compositions and methods of use are suitable for meeting various regulatory standards, including for example EPA food contact sanitizers requiring at least a 5 log reduction in pathogenic microorganisms in 30 seconds and/or NSF standards similarly requiring at least a 5 log reduction in treated pathogenic microorganisms. In still further aspects, without limiting the scope of the invention, the methods of the invention may provide sufficient sanitizing efficacy at conditions more or less strenuous than such regulatory standards.

The solid compositions and methods of use can be used for treating a target that is at least a portion of a container, an equipment, a system or a facility for holding, processing, packaging, storing, transporting, preparing, cooking or serving the food item or the plant item. In some embodiments, the target is at least a portion of a container, an equipment, a system or a facility for holding, processing, packaging, storing, transporting, preparing, cooking or serving a meat item, a fruit item, a vegetable item, or a grain item. In other embodiments, the target is at least a portion of a container, an equipment, a system or a facility for holding, processing, packaging, storing, or transporting an animal carcass. In still other embodiments, the target is at least a portion of a container, an equipment, a system or a facility used in food processing, food service or health care industry. In yet other embodiments, the target is at least a portion of a fixed in-place process facility. An exemplary fixed in-place process facility can comprise a milk line dairy, a continuous brewing system, a pumpable food system or a beverage processing line.

The various methods of cleaning and sanitizing according to the invention can include the use of any suitable level of the actives (e.g. quaternary ammonium compound and anionic surfactant). In some embodiments, the treated target composition comprises from about 1 ppm to about 5000 ppm of the active (e.g. quaternary ammonium compound and/or anionic surfactant, or nonionic surfactant) when diluted for use. In further embodiments, the treated target composition comprises from about 1 ppm and about 2000 ppm, 1 ppm and about 1500 ppm, 1 ppm and about 1000 ppm, 1 ppm and about 900 ppm, 1 ppm and about 800 ppm, 1 ppm and about 700 ppm, 1 ppm and about 600 ppm, 1 ppm and about 500 ppm, 1 ppm and about 400 ppm, 1 ppm and about 300 ppm, 1 ppm and about 200 ppm, 1 ppm and about 100 ppm, 5 ppm and about 100 ppm, 10 ppm and about 100 ppm, 20 ppm and about 100 ppm, 25 ppm and about 100 ppm, 10 ppm and about 75 ppm, 20 ppm and about 75 ppm, 25 ppm and about 75 ppm, or about 50 ppm of the active (e.g. quaternary ammonium compound) when diluted for use.

The various applications of use described herein can include fast-acting applications of use to soaking applications of use. However, the present methods require a certain minimal contact time of the compositions with the surface or product in need of treatment for occurrence of sufficient cleaning, antimicrobial effect and/or rinsing. The contact time can vary with concentration of the use compositions, method of applying the use compositions, temperature of the use compositions, pH of the use compositions, amount of the surface or product to be treated, amount of soil or substrates on/in the surface or product to be treated, concentration of actives of compositions, and the like. The contact or exposure time can be about 15 seconds, at least about 15 seconds, about 30 seconds or greater than 30 seconds. In some embodiments, the exposure time is about 1 to 5 minutes. In other embodiments, the exposure time is a few minutes to hours. In other embodiments, the exposure time is a few hours to days.

The present methods can be conducted at any suitable temperature. In some embodiments, the present methods are conducted at a temperature ranging from about 0° C. to about 5° C., e.g., from about 5° C. to about 10° C., 0° C. to about 10° C., 0° C. to about 20° C., 0° C. to about 40° C., 0° C. to about 50° C., 0° C. to about 80° C., or at increased temperatures there above suitable for a particular application of use.

The solid cleaning, sanitizing and/or rinsing compositions are suitable for antimicrobial efficacy against a broad spectrum of microorganisms, providing broad spectrum bactericidal and fungistatic activity. For example, the use of the present composition provides broad spectrum activity against wide range of different types of microorganisms (including both aerobic and anaerobic microorganisms, gram positive and gram negative microorganisms), including bacteria, yeasts, molds, fungi, algae, and other problematic microorganisms. The present methods can be used to achieve any suitable reduction of the microbial population in and/or on the target or the treated target composition. In some embodiments, the present methods can be used to reduce the microbial population in and/or on the target or the treated target composition by at least one log 10. In other embodiments, the present methods can be used to reduce the microbial population in and/or on the target or the treated target composition by at least two log 10. In still other embodiments, the present methods can be used to reduce the microbial population in and/or on the target or the treated target composition by at least three log 10. In still other embodiments, the present methods can be used to reduce the microbial population in and/or on the target or the treated target composition by at least five log 10. Without limiting the scope of invention, the numeric ranges are inclusive of the numbers defining the range and include each integer within the defined range.

In an aspect, the methods of the invention include generating a use solution from the concentrated solid compositions of the invention. A use solution may be prepared from the concentrate by diluting the concentrate with water at a dilution ratio that provides a use solution having desired cleaning, rinsing, sanitizing and/or other antimicrobial properties. The water that is used to dilute the concentrate to form the use composition can be referred to as water of dilution or a diluent, and can vary from one location to another. The typical dilution factor is between approximately 1 and approximately 10,000. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:100 and about 1:1,000 concentrate to water, or about 1:100 and about 1:500 concentrate to water. Without limiting the scope, the numeric ranges are inclusive of the numbers defining the range and include each integer within the defined range.

Figure 9:
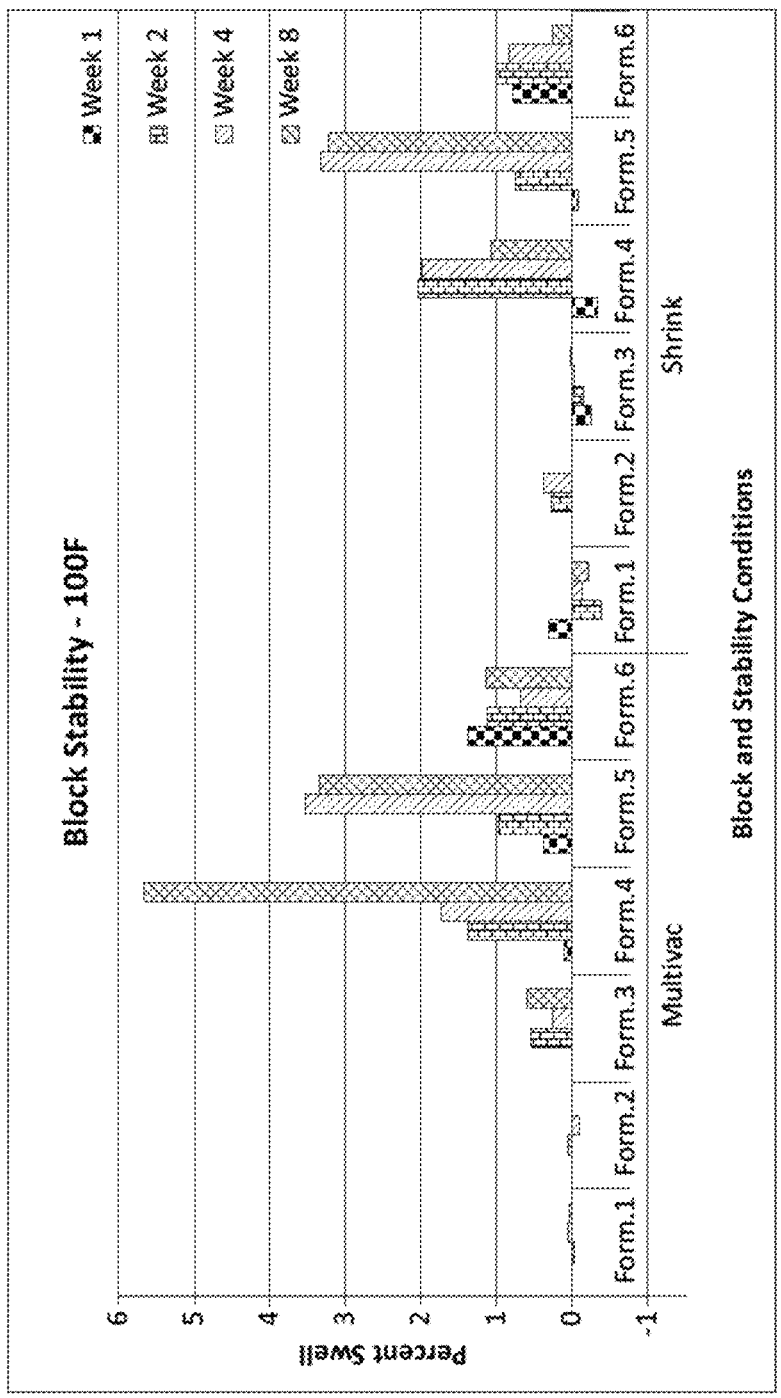
FIG. 9 shows the stability of the blocks at 100° F. over eight weeks, as expressed by percent swell.

The solid compositions can be dosed into an application of use, or dispensed as the concentrate or use solution, for example, in a warewashing machine, a car wash application, floor treatment application, or the like. In some embodiments, formation of a use solution can occur from a solid composition installed in a cleaning machine, for example onto a dish rack. In such an embodiment, the solid composition can be diluted and dispensed from a dispenser mounted on or in the machine or from a separate dispenser that is mounted separately but cooperatively with the dish machine. In other example embodiments, solid products may be conveniently dispensed by inserting a solid material in a container or with no enclosure into a spray-type dispenser such as the volume SOL-ET controlled ECOTEMP Rinse Injection Cylinder system manufactured by Ecolab Inc., St. Paul, Minn. Such a dispenser cooperates with a warewashing machine in the rinse cycle. When demanded by the machine, the dispenser directs a spray of water onto the solid composition which effectively dissolves a portion of the solid creating a concentrated aqueous rinse solution which is then fed directly into the machine forming the aqueous use solution. This dispenser and other similar dispensers are capable of controlling the effective concentration of the active portion in the aqueous use solution by measuring the volume of material dispensed, the actual concentration of the material in the rinse water (an electrolyte measured with an electrode) or by measuring the time of the spray on the solid composition. Additional embodiments of spray-type dispenser are disclosed in U.S. Pat. Nos. 4,826,661, 4,690,305, 4,687,121, and 4,426,362 and in U.S. Pat. Reissue Nos. 32,763 and 32,818, the disclosures of which are incorporated by reference herein. An example of a particular product shape is shown in FIG. 9 of U.S. Pat. No. 6,258,765, which is incorporated herein by reference.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The following Examples provide exemplary embodiments of the invention that shows improved storage stability for pressed solid blocks employing a solid complex of urea and acid. The following materials were employed:

Stepan BTC—a prilled quat-urea solid; 40% quaternary ammonium compound (50/50 ADBAC/ADEBAC) and 60% urea; wherein ADBAC refers to n-alkyl dimethyl benzyl ammonium chloride and ADEBAC refers to n-alkyl dimethyl ethylbenzyl ammonium chloride.

Sokalan DCS—mixture of succinic, adipic, and glutaric acid.

OA—Octanoic Acid

PA—Pelargonic Acid

ISO—Isononanoic acid.

Example 1

Various formulations using BTC/Citric Acid or Urea/Citric Acid mixtures were compared in terms of tablet storage stability at 40° C. The tablet storage stability in this Example was measured as a percentage change of the tablet over time at 37.5° C. and 55% room humidity. Table 2 lists the formulations and dimension for the tablets. In this example, formulations using urea/citric acid without added water were found to have better tablet stability. This observation leads to the assumption that some urea from BTC urea/quat complex releases the quat and from urea/acid complex instead, and this transformation causes dimensional changes due to the density differences of those two complexes.

In this Example, the order of addition when making tablet was also investigated for its effect on tablet storage stability. The results listed in Table 3 indicate that the order of addition do not affect the stability much. However, when using different acids to replace citric acid, the stability was improved a lot.

TABLE 2

Comparison of Urea with a Quat-Urea solid as the acid filler

| Description | Width | | | | | | |
|---|---|---|---|---|---|---|---|
| | Initial | Week 1 | Δ wk1 | Week 2 | Δ wk2 | Week 3 | Δ wk3 |
| 50% Urea; 45% Citric Acid | 44.97 | 45.3 | 0.7 | 45.3 | 0.73 | 45.26 | 0.64 |
| 50% Urea; 45% Citric Acid; 0.5% $H_2O$ | 45.06 | 47.03 | 4.4 | 47.43 | 5.26 | 47.5 | 5.42 |
| 50% Urea; 45% Citric Acid; 2.5% OA | 45.22 | 45.43 | 0.5 | 45.48 | 0.57 | 45.48 | 0.57 |
| 50% Urea; 45% Citric Acid; 2.5% OA; 0.5% $H_2O$ | 45.3 | 46.77 | 3.0 | 46.87 | 3.47 | 46.86 | 3.44 |
| 50% BTC; 45% Citric Acid | 45.24 | 45.39 | 0.3 | 45.65 | 0.91 | 46.7 | 3.23 |
| 50% BTC; 45% Citric Acid; 0.5% $H_2O$ | 45.19 | 45.89 | 1.5 | 46.7 | 3.34 | 48.5 | 7.32 |
| 50% BTC; 45% Citric Acid; 2.5% OA | 45.21 | 46.02 | 1.8 | 47.1 | 4.18 | 50.4 | 11.48 |
| 50% BTC; 45% Citric Acid; 2.5% OA; 0.5% $H_2O$ | 45.35 | 46.6 | 2.8 | 48.1 | 6.06 | 49.85 | 9.92 |

TABLE 3

Order of addition vs. Tablet Stability

| Order of Addition | Diameter (mm) | | | | | | | | |
|---|---|---|---|---|---|---|---|---|---|
| | Initial | Week 1 | Δ wk1 | Week 2 | Δ wk2 | Week 3 | Δ wk3 | Week 4 | Δ wk4 |
| BTC/OA/CA/$H_2O$ | 45.23 | 46.56 | 2.94 | 47.96 | 6.03 | 49.66 | 9.79 | 51.55 | 14.21 |
| BTC/CA/OA/$H_2O$ | 45.29 | 46.87 | 3.49 | 48.45 | 6.97 | 50.06 | 10.53 | 52.03 | 14.88 |
| CA/OA/BTC/$H_2O$ | 45.16 | 47.04 | 4.16 | 49.02 | 8.54 | 51.03 | 12.99 | 52.02 | 15.19 |
| BTC/ISO/DCS/$H_2O$ | 45.2 | 45.65 | 0.99 | 46.08 | 1.94 | 46.62 | 3.14 | 47.27 | 4.57 |
| BTC/DSC/ISO/$H_2O$ | 45.18 | 45.12 | 0.12 | 46.13 | 2.10 | 46.61 | 3.16 | 47.33 | 4.75 |
| DSC/ISO/BTC/$H_2O$ | 45.16 | 45.65 | 1.08 | 46.13 | 2.05 | 46.57 | 3.12 | 47.21 | 4.53 |
| BTC/Aspartic/PA | 45.2 | 45.3 | 0.2 | 45.4 | 0.44 | 45.4 | 0.44 | | |
| BTC/Glutamic/PA | 45.1 | 45.4 | 0.7 | 45.4 | 0.67 | 45.4 | 0.67 | | |

These results are also shown in FIG. 1.

The results in this Example show that the acid filler plays an important role in storage stability. Without being bound by theory, the data show that acid solubility and pKa make a difference in the storage stability, because urea acts as a weak base and reacts with the acid to cause the swelling of the tablet.

Example 2

Figure 2:
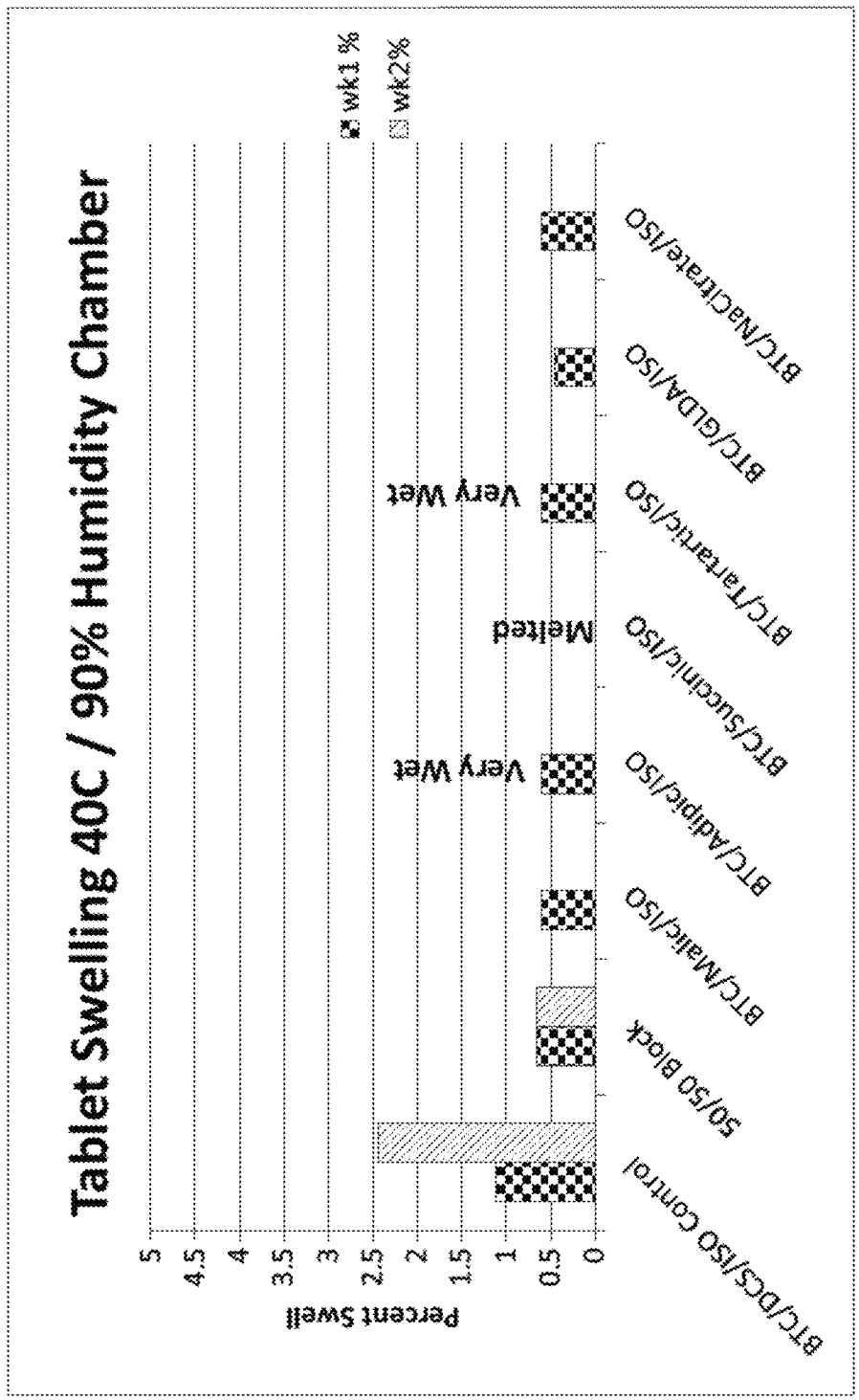
FIG. 2 shows the swellings of the tablets using various exemplary acid(s) as the acid filler in a 40° C. and 90% humidity chamber over 2 weeks.
Figure 3:
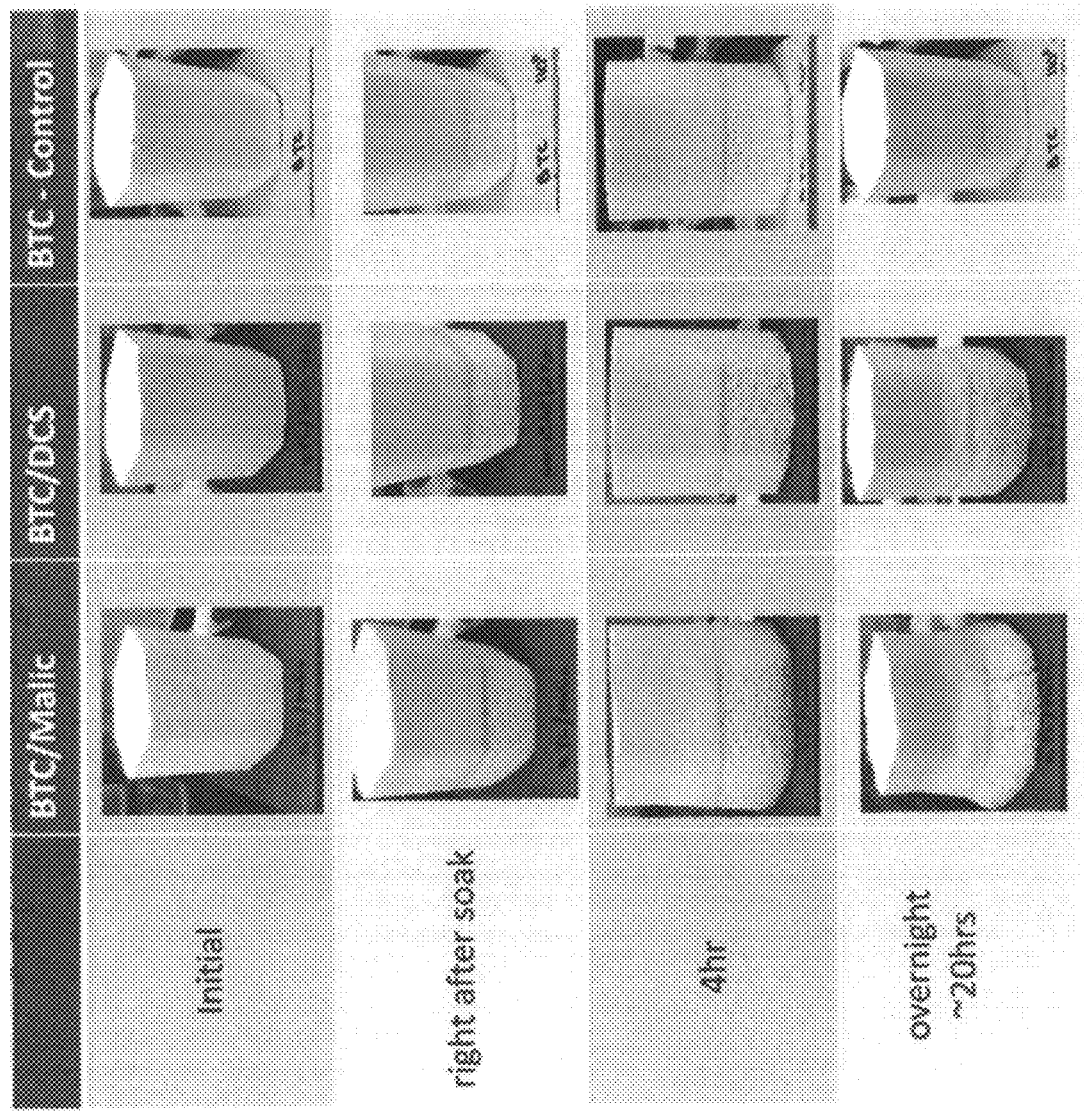
FIG. 3 shows the swellings of the blocks using various exemplary acid(s) as the acid filler after soaking in water for a period of 1 minute over 20 hours.

Table 4 lists various acids that were tested as the acid filler. In this table, the measured swelling of the tablet using the acid as the filler and corresponding solubility and pKa are also listed. The swellings of the tablets made with various acids were measured over a two-week period of time and the results are shown in FIG. 2. In addition, the blocks were made with various acids and their swellings were measured over a period of time. Some pictures of the soaked blocks at different time are shown in FIG. 3.

TABLE 4

| Acid Filler | 4 Week at 40° C. |
|---|---|
| Citric Acid | 14% |

TABLE 4-continued

| | |
|---|---|
| Succinic Acid | Melted |
| Sodium Bisulfate | Melted |
| Sulfamic Acid | Melted |
| Adipic Acid | ~3% |
| Glutamic Acid | ~1% |
| Sokalan DSC (Succinic, Glutaric, Adipic | ~5% |
| Aspartic Acid | ~1.5% |
| Malic Acid | ~5% |
| Maleic Acid | Melted |
| Tartaric Acid | Melted |
| Lactic Acid | Weeping (melted at 50° C.) |
| Monosodium citrate | ~0.5% |
| Malonic Acid | Weeping |
| Urea-Citrate | 0.5% at 2 weeks |

The data in Table 4 indicate the correlation between swelling and pKa and solubility. Stronger and less soluble acids cause less swelling when they are used as the acid filler in the tablets. Specifically, glutamic acid, aspartic acid, and monosodium citrate proved to be stable acid fillers for storage stability. However, these compounds are not ideal as acid fillers, because their dissolution rates and inability to reach the desired pH for better cleaning.

This example further confirms the reactivity of the urea and acid under stressed storage conditions are impacted by both solubility of the acid as reacted with urea (a weak base) and pKa of the strongest proton of the acid. As shown, the use of glutamic acid and aspartic acid (without pre-complexing with urea) successfully forms the complex and maintains stability of the composition due to the solubility of the acid. Other successful acid species are GLDA and monosodium citrate (without pre-complexing with urea) which successfully forms the complex and maintains stability of the composition due to the pKa of the acid.

Example 3

In this Example, tablets made from BTC/DCS/ISO (50/45/2.5) and BTC/DCS (50/50), respectively, were compared in terms of storage stability.

TABLE 5

Dimension Measurements for BTC/DCS/ISO (50/45/2.5) and BTC/DCS (50/50) Tablets.

| | Initial (mm) | Week 1 (mm) | Week 2 (mm) | Week 3 (mm) | Week 4 (mm) |
|---|---|---|---|---|---|
| BTC/DCS/ISO (50/45/2.5) | 45.2 | 45.7 | 46.3 | 46.7 | 46.9 |
| BTC/DCS (50/50) | 45.2 | 45.5 | 45.5 | 45.5 | 45.5 |
| | | Change wk1 % | Change wk2 % | Change wk3 % | Change wk4 % |
| BTC/DCS/ISO (50/45/2.5) | | 1.10 | 2.43 | 3.31 | 3.76 |
| BTC/DCS (50/50) | | 0.66 | 0.66 | 0.66 | 0.66 |

Figure 4:
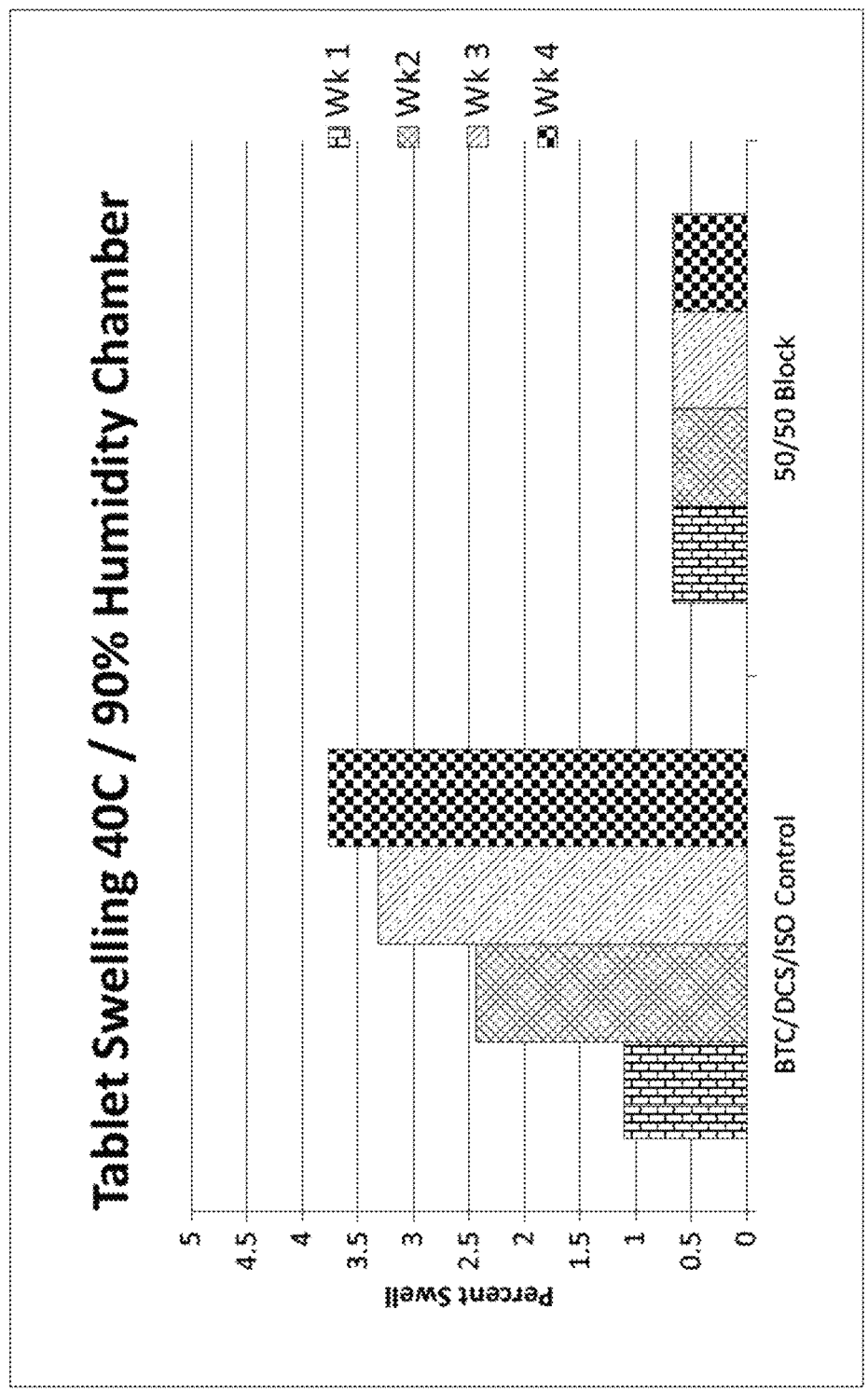
FIG. 4 shows the swelling comparison of two tablets using BTC/DCS/ISO (50/45/2.5) and BTC/DCS (50/50), respectively in a 40° C. and 90% humidity chamber over 4 weeks.

The dimension measurements are listed in Table 5 and the swelling data are shown in FIG. 4.

Example 4

In this Example, water's effect on tablet storage stability was investigated. Full scale pressed solid blocks were formulated with water or without water were made and then wrapped in two different packages, Multi-vac or Shrink. The DCS was used as the acid filler. Tablets were then placed at two different temperatures and their dimensions were measured over a period time. The formulations for two kinds of tablets are listed in Table 6.

TABLE 6

Formulations with Water or without Water

| Description | Dye + Water | No Water |
|---|---|---|
| Stepan BTC | 50% | 50% |
| Sokalan DCS | 44.5% | 45% |
| Isononanoic Acid | 2.5% | 2.5% |
| Water/Dye | 0.5% | — |

Figure 5:
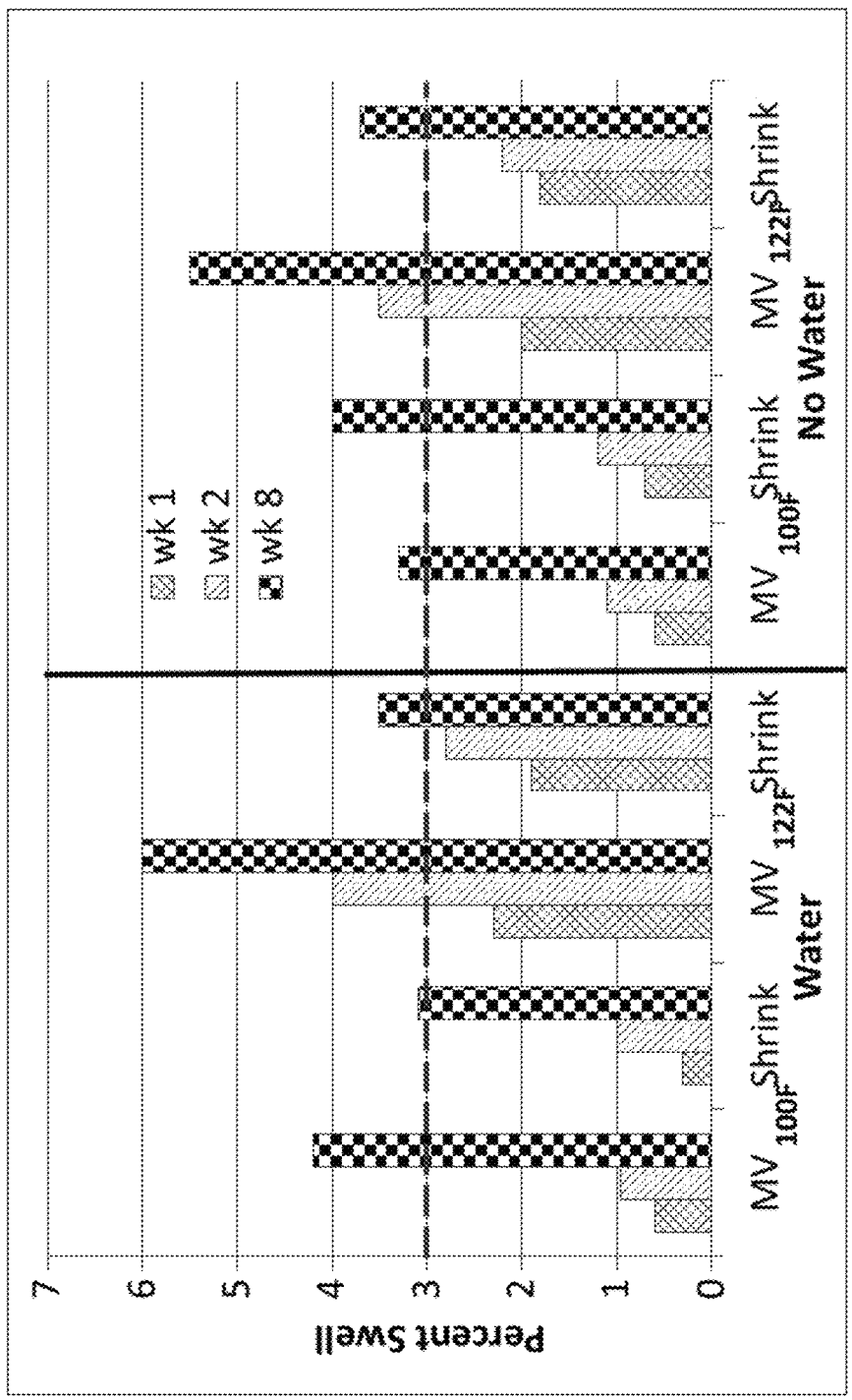
FIG. 5 shows the effect of water and method of wrapping (i.e. multi-vac (MV) or shrink-wrap (Shrink)) on swelling of the tablets at two different temperatures.

The block stability data is shown in FIG. 5, which depicts the dimensional stability (measured by a 3% growth exponent (or swell) of the solid as a commercially relevant threshold for solid stability. Over the increase in time 1 week to 8 weeks the blocks demonstrated swelling issues under the various conditions demonstrating further need for the stable solid compositions and methods of formulating according to the invention.

Example 5

In this Example, the properties of urea/citric acid complex were investigated. First, urea-citric acid complex was produced with the following procedure to create a crystalized complex. In a 600 mL beaker, 100.1 g of 50% urea stock solution (50.05 g urea, 0.833 moles) was added to 320 g of 50% citric acid (160 g citric acid, 0.833 moles). The solution was allowed to stir for 3 minutes and then the beaker was placed in an ice bath, where the crystallization process starts almost immediately to yield urea-citric acid complex. After 30 minutes in the ice bath, the complex was collected through vacuum filtration and then dried in a vacuum oven at 40° C. and 30 torr for 3 hours.

The IR spectrum of the complex shows unique peaks that are not present in IR spectra of either urea or citric acid. The unique peaks observed for the complex include shifted asymmetric stretching of $NH_2$ group, new peaks in the carboxylate region, and new well-defined peaks in the fingerprint region.

Figure 6:
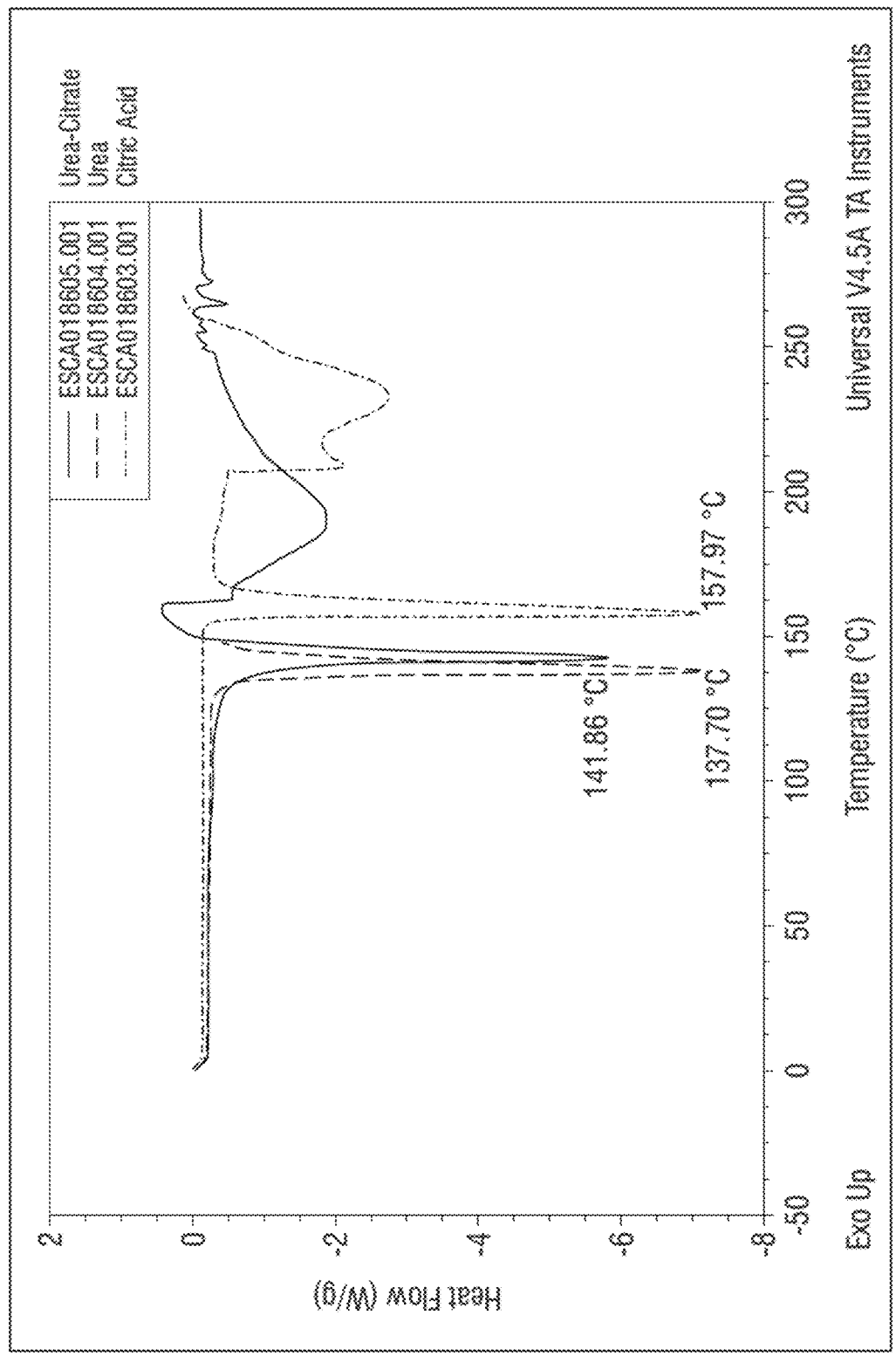
FIG. 6 shows the DSC spectra of urea-citric acid complex, urea, and citric acid, respectively.

The Sokolan DSC acid of the complex is shown in FIG. 6. The DSC of the 1:1 urea/citric acid complex shows its endothermic melting peak at 142° C., while those for citric acid and urea at 158° C. and 138° C., respectively.

The pH of the urea/citric acid complex was also compared to those of citric acid and monosodium citrate. The data are shown in Table 7.

TABLE 7

The pHs of the urea-citric acid complex, citric acid, and monosodium citrate in 17 grains per gallon (gpg) water

| | Dose | pH in 17 gpg Water |
|---|---|---|
| Citric Acid | 625 ppm | 4.45 |
| Urea-Citric | 625 ppm | 4.8 |
| Monosodium Citrate | 625 ppm | 5.6 |

According to an embodiment of the invention, the solid complex can formed through crystallization comprising the steps of combining the urea and acid in a solution for a sufficient period of time before placing the solution in an ice bath (or cold water water) for the crystallization process to begin. The solution is left in the ice (or cold water) bath for a sufficient amount of time for the crystallization to run through completion, which may be at least 10 minutes, at least 15 minutes, at least 20 minutes, at least 25 minutes, or at least 30 minutes. Thereafter the solid complex is collected, such as through a vacuum filtration.

Example 6

Additional studies were conducted to confirm the stabilizing effect of the urea/citric acid complex. A formulation using urea/citric acid complex as the acid filler were compared to those using urea or a mixture of urea and citric acid. In this Example, tablets were made according to the formulations in Table 8, then placed at 40° C. and 90% humidity. Their dimensional changes were measured during two-weeks period of time. The results were shown in FIG. 7.

TABLE 8

| Formulation | Weight % | Week 1 | % | 10 Day | % |
|---|---|---|---|---|---|
| BTC/CA/ISO | 50/47.5/2.5 | 46.5 | 2.876106 | 46.75 | 3.429204 |
| BTC/CA-Urea/ISO | 50/47.5/2.5 | 45.45 | 0.5530097 | 45.5 | 0.663717 |
| BTC/CA/Urea/ISO | 50/42.5/5/2.5 | 47 | 3.982301 | 47.5 | 5.088496 |

Figure 7:
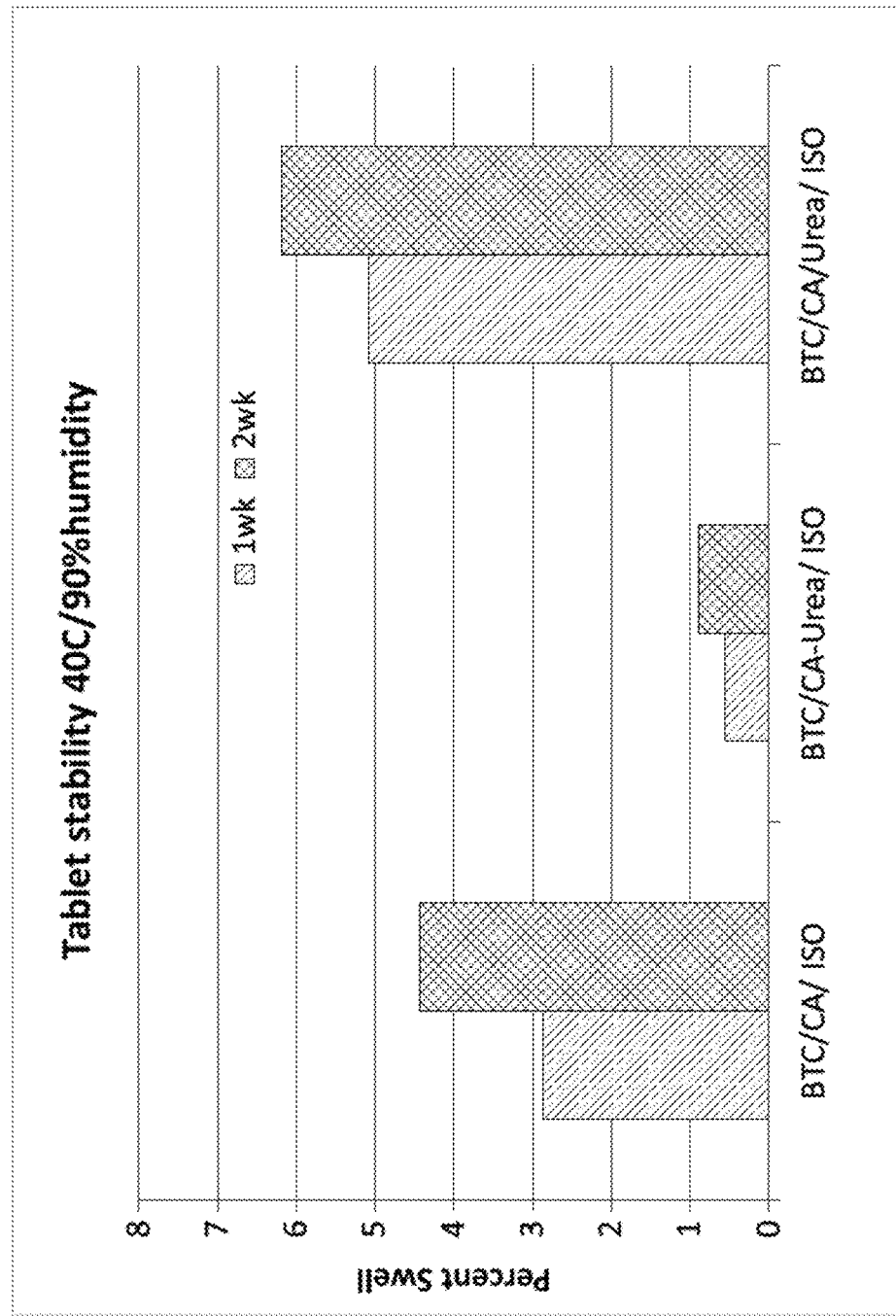
FIG. 7 shows the stability of tablets using citric acid, urea-citric acid complex, and a mixture of urea and citric acid, respectively, in a 40° C. and 90% humidity chamber over 2 weeks.

As shown in Table 8 and FIG. 7, the formulation using urea-citric acid complex as the acid filler has the best storage stability as measured by the lowest percentage swelling (the dimensional stability).

Example 7

Figure 8:
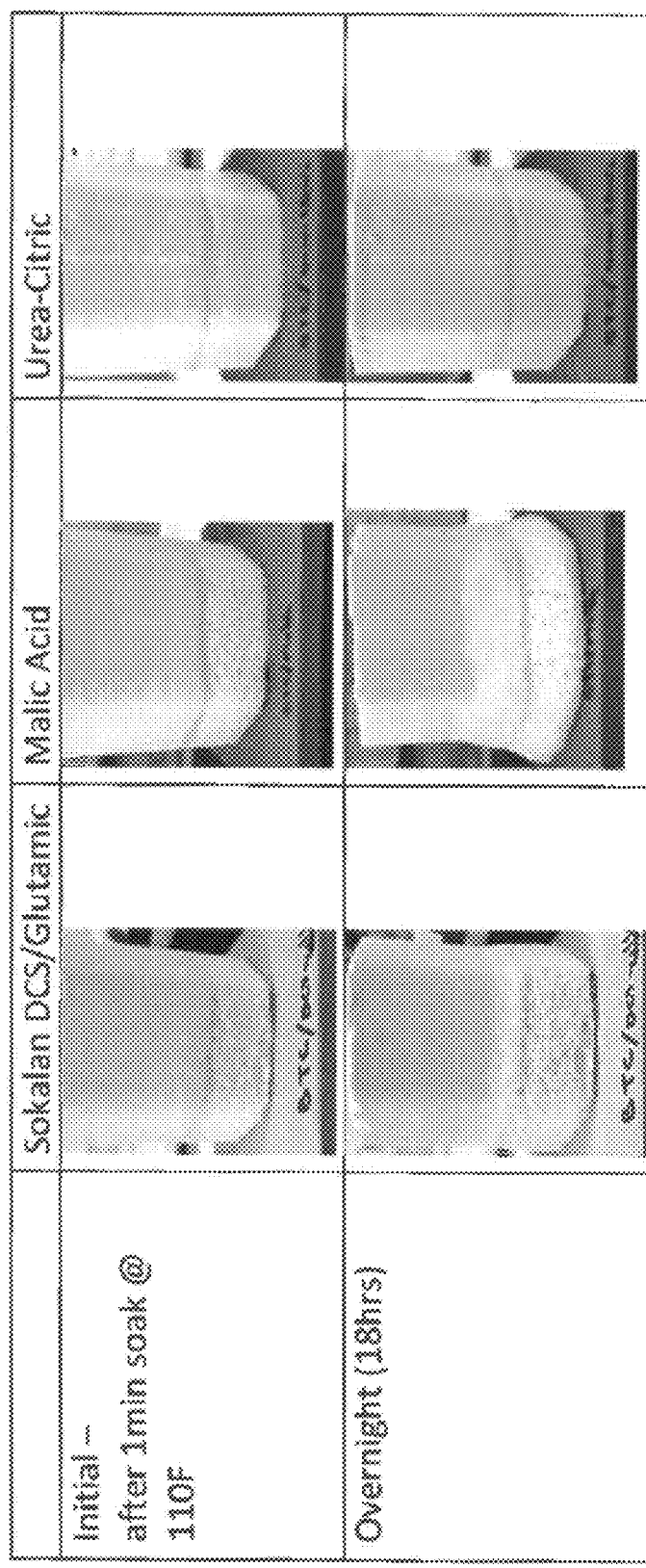
FIG. 8 shows the stability of the blocks using DCS/Glutamic Acid, Malic acid, and urea-citric acid complex, respectively, after 1 minute soaking at 43.3° C. over a period of 18 hours.

Various blocks made from different formulations were screened for their block stability in a dispenser. During the experiments, the blocks were soaked in 1 inch of water at 43.3° C. (110° F.) for 1 minute, then measured for their swelling as a function of time. The pictures of the blocks right after soak and after 18 hours are shown in FIG. 8. FIG. 8 shows that swelling is minimal for the block made with the urea/citric acid complex.

Example 8

Further studies were conducted to compare the stability of solid compositions containing the urea/citric acid complex, and solid compositions where monosodium citrate was substituted as the acid. Six formulations were prepared according to the formulations of Table 9; the formulations were pressed and packaged in two materials, Multivac or shrink wrap. The solid formulations were then analyzed for eight weeks under two temperature conditions: 100° F. and 122° F. The block dimensions of the solid formulations were recorded with 24 hours of original pressing, at 1 week, 2 weeks, 4 weeks, and 8 weeks. The percent swelling was ascertained by measuring the change in length, width, and height of the block.

TABLE 9

| Formulation | BTC Quat wt-% | Urea/Citric Acid wt-% | Monosodium Citrate wt-% | Fatty Acid wt-% | Dye wt-% | Water wt-% |
|---|---|---|---|---|---|---|
| 1 | 50 | | 47 | 2.5 | 0.024 | 0.476 |
| 2 | 50 | | 47 | 2.5 | 0.024 | 0.476 |
| 3 | 47 | | 47.5 | 2.5 | 0.024 | 2.976 |
| 4 | 50 | 47 | | 2.5 | 0.024 | 0.476 |
| 5 | 50 | 47 | | 2.5 | 0.024 | 0.476 |
| 6 | 50 | 47 | | 2.5 | 0.024 | 0.476 |

Figure 10:
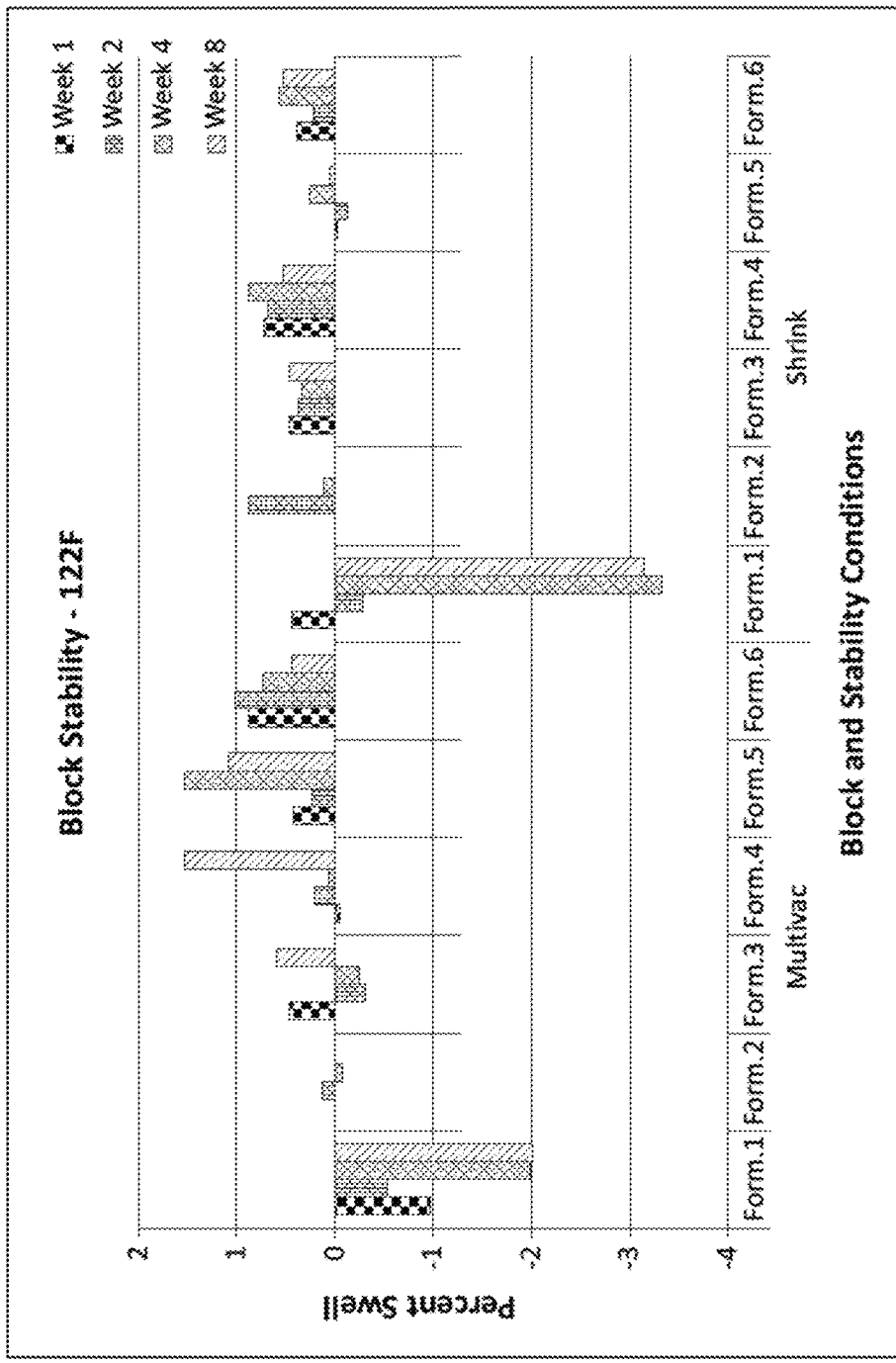
FIG. 10 shows the stability of the blocks at 122° F. over eight weeks, as expressed by percent swell.

At 100° F., the exemplary formulations 1-3 demonstrated less than 1% swelling over the course of eight weeks. Formulations 3-6 on average demonstrated approximately 3% swelling, with only Formulation 4 reaching over 5%. At 120° F., all formulations demonstrated less than 2% swelling over the course of eight weeks. As a result, the formulations demonstrated swelling less than and/or within the commercially relevant threshold for swelling (3%), which is surprising given that solid acids generally result in much greater swelling under similar conditions. The difference in swelling recorded between the types of formulations at 100° F. is thought to be the result of differences in the batches of urea citrate used, as the batch used for formulations 3-6 contained excess free water, resulting in less stability. These results are also depicted in FIGS. 9 and 10.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A stabilized solid composition comprising:
a preformed solid complex comprising a urea solidification matrix and an acid, wherein the urea and the acid in the solid complex are in a molar ratio from about 1:3 to about 3:1, wherein the acid is a solid or liquid organic acid and comprises at least one of: monosodium citrate, aspartic acid, and glutamic acid; and
a quaternary ammonium compound having the formula:

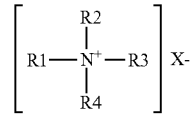

wherein groups R1, R2, R3, and R4 each have less than a $C_{20}$ chain length, $X^-$ is an anionic counteranion selected from the group consisting of chloride, bromide, propionate, methosulphate, saccharinate, ethosulphate, hydroxide, acetate, phosphate, carbonate and nitrate, and wherein the composition is a solid that is soluble in water, and has a pH of about 2 and about 6 in a use solution.

2. The composition of claim 1, wherein the urea is in the form of prilled beads or powder.

3. The composition of claim 1, wherein at least a portion of the urea is in a complex with a quaternary ammonium compound.

4. The composition of claim 1, wherein the acid is water soluble, sparingly water soluble, or water insoluble.

5. The composition of claim 1, wherein the acid further comprises citric acid, sulfamic acid, malic acid, maleic acid, tartaric acid, lactic acid, succinic acid, adipic acid, hydroxyacetic acid, formic acid, acetic acid, propionic acid, butyric acid, valeric acid, caproic acid, gluconic acid, itaconic acid, trichloroacetic acid, benzoic acid, oxalic acid, malonic acid, glutaric acid, fumaric acid, adipic acid, and/or terephthalic acid.

6. The composition of claim 1, wherein the quaternary ammonium compound is selected from the group consisting of monoalkyltrimethyl ammonium salts, monoalkyldimethylbenzyl ammonium salts, dialkyldimethyl ammonium salts, heteroaromatic ammonium salts, polysubstituted quaternary ammonium salts, bis-quaternary ammonium salts, polymeric quaternary ammonium salts, and combinations thereof.

7. The composition of claim 1, wherein the composition comprises more than one preformed solid complex, and wherein each preformed solid complex comprises a distinct acid.

8. A stabilized solid composition comprising:
a solid complex comprising a co-crystallized urea solidification matrix and an organic acid, wherein the urea and the organic acid in the solid complex are in a molar ratio from about 1:3 to about 3:1; and wherein the organic acid comprises at least one of: monosodium citrate, aspartic acid, and glutamic acid;

wherein the composition is a solid that is soluble in water, has a pH of about 2 to about 6 in a use solution, and provides efficient sheeting performance without resulting in spotting and/or filming.

9. The composition of claim 8 wherein the solid complex is preformed.

10. The composition of claim 8, further comprising a nonionic surfactant, wherein the nonionic surfactant is an alcohol ethoxylate, block copolymer, amine oxide, alkylpolyglucoside, and/or combinations thereof.

11. The composition of claim 8, wherein the composition comprises more than one preformed solid complex, and wherein each preformed solid complex comprises a distinct acid.

12. A method of making the solid composition of claim 1, comprising: preforming a solid complex of the urea and the acid; and adding any additional active components to the solid complex of urea and the acid to form a solid composition.

13. The method of claim 12, wherein additional urea is added to the solid complex and the additional urea is in an adduct with the quaternary ammonium compound.

14. The method of claim 12, wherein the urea and the acid are combined in a solution and co-crystallized to form the solid complex.

* * * * *

UNITED STATES PATENT AND TRADEMARK OFFICE
CERTIFICATE OF CORRECTION

| | | |
|---|---|---|
| PATENT NO. | : 12,096,769 B2 | Page 1 of 1 |
| APPLICATION NO. | : 17/453891 | |
| DATED | : September 24, 2024 | |
| INVENTOR(S) | : Derrick Anderson et al. | |

It is certified that error appears in the above-identified patent and that said Letters Patent is hereby corrected as shown below:

In the Claims

In Claim 1, at Column 44, Line 30:
DELETE: "$C_{20}$"
INSERT: --C20--

In Claim 1, at Column 44, Line 30:
DELETE: "counteranion"
INSERT: --counterion--

Signed and Sealed this
Eighteenth Day of March, 2025

Coke Morgan Stewart
*Acting Director of the United States Patent and Trademark Office*